United States Patent Office 3,631,208
Patented Dec. 28, 1971

3,631,208
COUPLING OF PHENOLS WITH
DIPHENOQUINONES
Allan S. Hay, Schenectady, N.Y., assignor to
General Electric Company
No Drawing. Continuation-in-part of abandoned applications Ser. No. 306,301 and Ser. No. 306,302, both Sept. 3, 1963. This application June 10, 1966, Ser. No. 556,575
Int. Cl. C07c 43/20, 43/22, 39/12
U.S. Cl. 260—619 R                   21 Claims

ABSTRACT OF THE DISCLOSURE

Binary self-condensation products of phenols are prepared by reacting them with diphenoquinones in the liquid phase. Since the diphenoquinones themselves can be prepared from phenols, the phenols need to be the only starting material to produce the self-condensation products. By using 2,6-disubstituted phenols and the corresponding diphenoquinones prepared from the particular 2,6-disubstituted phenol, the self-condensation product of the phenol is a 2,2',6,6'-p,p'-biphenol and is produced both from the phenol and diphenoquinone reaction. Since 2,6-disubstituted phenols may be made by alkylation of either phenol or 2-substituted phenols and the biphenol product may be readily dealkylated, biphenols can be made which have from 0 to 4 substituents in the 2,2',6 and 6' positions.

---

This application is a continuation-in-part of my applications, Ser. Nos. 306,301 and 306,302, both filed Sept. 3, 1963 and both now abandoned, and assigned to the same assignee as the present invention.

This invention relates to the preparation of binary self-condensation products of phenols by a process which comprises reacting phenols with diphenoquinones in the liquid phase, and to the novel products produced by this method. More particularly, this invention relates to the preparation of binary self-condensation products of phenols having from 0 to 2 substituents in the ortho and para positions with respect to the phenolic hydroxyl group wherein each such substituent is a monovalent radical selected from the group consisting of alkyl, alkoxy, aryl and aryloxy radicals, which comprises reacting said phenol in the liquid phase with a 3,3',5,5'-tetrasubstituted diphenoquinone whose substituents are also monovalent radicals selected from the group consisting of alkyl, alkoxy, aryl and aryloxy radicals.

In the reaction, 2 moles of the phenol are connected together through the unsubstituted ortho or para position to form a biphenol and simultaneously the diphenoquinone is reduced to a p,p'-biphenol. If a 2,6-disubstituted phenol is used, then both the diphenoquinone and the phenol produce a p,p'-biphenol. The biphenol produced from the phenol can be identical or different from the biphenol produced from the diphenoquinone.

Is some of the substituents on the biphenols are tertiary alkyl groups, these biphenols may be dealkylated to remove the tertiary alkyl groups. The olefin produced in the dealkylation may be recovered and used to produce a tertiary alkyl-substituted phenol which in turn may either be reacted with a diphenoquinone to produce a biphenol or converted to a diphenoquinone which may be used as described above. Therefore, this invention also relates to the preparation of p,p'-biphenols by a process which comprises reacting 2,6-disubstituted phenols in the liquid phase with 3,3',5,5'-tetrasubstituted diphenoquinones and thereafter dealkylating the biphenols to the desired biphenols. In certain aspects, this invention also includes the preparation of 2,6-disubstituted phenols and the diphenoquinones used to form the biphenols as part of the overall reaction.

Biphenols, especially those from 2,6-disubstituted phenols, have found a wide utility, especially in the petroleum industry, as stabilizers for cracked gasolines. They are also useful in the preparation of resins, e.g., polyesters and polycarbonate resins, wherein they are used as the dihydroxy compound which is reacted either with phosgene or with a dibasic acid, polyepoxides, polyurethanes, etc.

Previous to my invention, p,p'-biphenols have been rather difficult to produce because of the involved procedure required, the tendency to produce undesirable by-products and the relatively low yields in the process steps. These biphenols were prepared by first forming the diphenoquinone which then had to be reduced to the corresponding biphenol. In forming the diphenoquinone, it was necessary to use either a 2,6-dialkyl phenol, which was oxidized with chromic acid or nitric acid to the diphenoquinone, or to use a 2,6-dialkyl-4-halophenol, which was reacted with a metal such as copper in the presence of an alkali to form the diphenoquinone. Reduction of the diphenoquinone is then accomplished by reducing the diphenoquinone with hydrogen usually produced in situ by reaction of a metal with an organic carboxylic acid, such as acetic acid. Yields of the diphenoquinone from the phenol under these reaction conditions are somewhat dependent upon the substituent in the 2- and 6-position of the phenol, straight-chain alkyl groups usually giving yields of 50–60% of the corresponding diphenoquinone, while large, bulky groups such as tertiary butyl groups gave yields up to 80%. Reduction of the diphenoquinone to the corresponding biphenol could be accomplished essentially quantitatively. However, because of the high cost of producing biphenols by these reactions, these biphenols have not found as wide use in the preparation of polyesters and polycarbonates as they would if they could be produced for a lower price. It would also be desirable to produce these biphenols for use as antioxidants at a lower price, and in higher yields than can now be done by the present processes.

Phenol itself or monosubstituted orthophenols can not be used in the above reactions since such phenols can not be oxidized to the corresponding diphenoquinones. In order to produce p,p'-biphenol itself or 2,2'-disubstituted p,p'-biphenols, it has been necessary to first produce the corresponding biphenyl, followed by sulfonation and alkali fusion, and then hydrolysis, to produce the corresponding biphenol. However, such processes produce considerable quantities of undesirable by-products.

The p,p'-biphenols having no substituents or substituents such as aryl, e.g., phenyl which are not subject to oxidative attack are desirable products not only as stabilizers for petroleum products such as cracked gasolines, but they are also useful in the preparation of resins, as described above. However, because of the high cost of producing such p,p'-biphenols by the previous reactions, these biphenols have not found as wide use as they would if they could be produced for a lower price.

In my copending application, Ser. No. 212,127, now U.S. Pat. 3,306,874 and Ser. No. 212,128, now U.S. Pat. 3,306,875, filed July 24, 1962, and assigned to the same assignee as the present invention, which latter application is a continuation-in-part of my applications, Ser. No. 69,245, filed Nov. 5, 1960 and Ser. No. 744,086, filed June 24, 1958, both of which are now abandoned, I have disclosed and claimed a facile method for the making of 3,3',5,5'-tetrasubstituted diphenoquinones by reacting 2,6-disubstituted phenols with oxygen using as the oxygen-carrying intermediate a solution of an amine-basic cupric salt complex in which the phenol is soluble. In my copending application, Ser. No. 239,316, now U.S. 3,210,384, filed Nov. 21, 1962 as a continuation-in-part of my abandoned application, Ser. No. 117,837, filed July 19, 1961, both assigned to the same assignee as the present invention, I have disclosed and claimed a method for making 3,3',5,5'-tetrasubstituted diphenoquinones by reacting oxygen with 2,6-disubstituted phenols, using as the oxygen-carrying intermediate a complex of a basic cupric salt with nitriles or tertiary amides.

I have now discovered that 3,3',5,5'-tetrasubstituted diphenoquinones will react with phenols having at least one ortho or para position unsubstituted, whereby 2 molecules of the phenol are coupled together with the diphenoquinone being reduced to a biphenol. The reaction goes rapidly and produces the products in high yields so that the net result of the entire reaction is the conversion of phenols into biphenols with the only reactants being the phenols and oxygen. Such a process allows biphenols to be prepared not only in very high yields but at very low cost. Those biphenols having alkyl groups having more than 2 carbon atoms, especially if they are tertiary alkyl groups, may be dealkylated.

The specific objects of this invention are to provide:

(1) A method for producing self-condensation products of phenols by reacting phenols with 3,3',5,5'-tetrasubstituted diphenoquinones.

(2) A method of producing 2,2',6,6'-tetrasubstituted p,p'-biphenols by reacting 2,6-disubstituted phenols with 3,3',5,5'-tetrasubstituted diphenoquinones.

(3) A method of converting 2,6-disubstituted phenols to 2,2,6,6'-tetrasubstituted p,p'-biphenols by first converting the said phenols to the corresponding 3,3',5,5'-tetrasubstituted diphenoquinones and thereafter reacting the said diphenoquinones with an additional amount of the said phenols.

(4) A method of making p,p'-biphenol and 2,2'-disubstituted biphenols by first making a 2,2',6,6'-tetrasubstituted p,p'-biphenol by reacting a 2,6-disubstituted phenol and a 3,3',5,5'-tetrasubstituted diphenoquinone wherein at least one of the substituents of the phenol and at least one of the substituents on each of the phenyl nuclei of the diphenoquinone are tertiary alkyl groups and thereafter dealkylating the 2,2',6,6'-tetrasubstituted p,p'-biphenol so produced.

(5) A method of converting a 2,6-disubstituted phenol wherein at least one of the substituents is a tertiary alkyl group to p,p'-biphenol when both substituents of said phenol are a tertiary alkyl group and a 2,2'-disubstituted p,p'-biphenol when only one substituent of said phenol is a tertiary alkyl group by first converting said phenol to the corresponding 3,3',5,5'-tetrasubstituted diphenoquinone, then reacting said diphenoquinone with an additional amount of said phenol and thereafter dealkylating the 2,2',6,6'-tetrasubstituted p,p'-biphenol so produced.

(6) A method of converting phenol to p,p'-biphenol and 2-substituted phenols to 2,2'-disubstituted p,p'-biphenols by first alkylating said phenols to produce 2,6-disubstituted phenols, then converting the 2,6-disubstituted phenols to 3,3',5,5'-tetrasubstituted diphenoquinones, followed by reacting said diphenoquinones with an additional amount of said 2,6-disubstituted phenols and thereafter dealkylating the 2,2',6,6'-tetrasubstituted p,p'-biphenols so produced.

(7) The novel p,p'-biphenols—2,2',6,6'-tetraphenyl-p,p'-biphenol, 2,2'-di-t-butyl-6,6'-diphenyl-p,p'-biphenol and 2,2'-diphenyl-p,p'-biphenol. These and other objects of my invention will be readily apparent from the following detailed description.

The phenols which can be used as starting materials are phenols having the general formula I 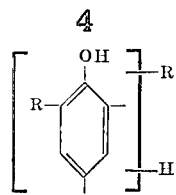

where each R is the same or different monovalent substituent selected from the group consisting of hydrogen, alkyl, alkoxy, aryl and aryloxy radicals. These phenols are reacted in a liquid phase with a 3,3',5,5'-tetrasubstituted diphenoquinone having the general formula II 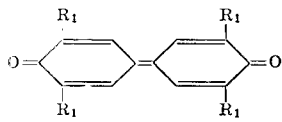

where each $R_1$ may be the same or different monovalent radical selected from the group consisting of alkyl, alkoxy, aryl and aryloxy radicals. These diphenoquinones are sometimes named 3,3',5,5' - tetrasubstituted - 4,4'-diphenoquinones, but this does not follow the standard nomenclature.

Typical examples of the alkyl, alkoxy, aryl and aryloxy radicals which R and $R_1$ may be, include any of the above radicals having any number of carbon atoms since these substituents do not interfere either with the coupling of the phenol to the biphenol or with the reduction of the di phenoquinone to the biphenol. They may include, for example, from 1 to 40 or more carbon atoms and the alkyl and alkoxy radicals may include primary, secondary, or tertiary alkyl groups and cycloalkyl groups. Since the most readily available of the substituted phenols for forming either the diphenoquinones or the biphenols are those phenols having substituents having from 1 to 8 carbon atoms, they are preferred, but the invention is not limited thereto. Typical examples of alkyl, alkoxy, aryl and aryloxy radicals are for example, methyl, methoxy, ethyl, ethoxy, propyl, propoxy, isopropyl, isopropoxy, the isomeric butyl and butoxy radicals, i.e., n-butyl, n-butoxy, isobutyl, isobutoxy, cyclobutyl, cyclobutoxy, t-butyl, t-butoxy, etc., the isomeric amyl radicals, the isomeric amyloxy radicals, the isomeric hexyl radicals, the isomeric hexyloxy radicals, the isomeric decyl radicals, the isomeric decyloxy radicals, the isomeric hexadecyl radicals, the isomeric hexadecyloxy radicals, the isomeric eicosyl radicals, the isomeric eicosyloxy radicals, the isomeric tricosyl radicals, the isomeric tricosyloxy radicals, the isomeric triacontyl radicals, the isomeric triacontyloxy radicals, etc. The alkyl radicals may be substituted with aryl or cycloalkyl radicals, for example, benzyl, phenylethyl, cyclohexylethyl, naphthylethyl, etc. Examples of aryl and aryloxy radicals are phenyl, phenoxy, tolyl, toloxy, xylyl, xylyloxy, biphenylyl, biphenylyloxy, naphthyl, naphthyloxy, methylnaphthyl, methylnaphthyloxy, ethylphenyl, cyclohexylphenyl, etc. Because the phenols in which the R substituents are methyl, ethyl, propyl, butyl, sec-butyl, isopropyl, t-butyl, amyl, sec-amyl, t-amyl, hexyl, heptyl, octyl, etc., or phenyl are either readily available commercially or easily made and are ideally suited for my process, the most preferred substituents are those where R and $R_1$ of both the phenol and diphenoquinone are either a lower alkyl group (e.g., from 1 to 8 carbon atoms), or phenyl.

Examples of phenols having the R substituents noted above which I may use as starting materials are phenol itself (hydroxybenzene), 2-methylphenol (ortho-cresol), 4-methylphenol (para-cresol), 2,4 - dimethylphenol (2,4-xylenol), 2,6 - dimethylphenol (2,6 - xylenol), 2-amyl-6 - methylphenol, 2,6-di-t-butylphenol, 2,6 - diphenylphenol, 2-ethylphenol, the 2-propylphenols, the 2-butylphenols, 2 - cyclohexylphenol, 2 - benzylphenol, the 2- octadecylphenols, 2 - triacontylphenol, 2 - phenylphenol, 2-tolylphenol, 2 - naphthylphenol, 2 - methoxyphenol (guaiacol), 2 - ethoxyphenol, 2 - butoxyphenol, 2 - lauroxyphenol, 2 - cyclohexyloxyphenol, 2-benzyloxyphenol, 2-tolyloxyphenol, 2 - phenoxyphenol, 2 - methyl - 6 - phenylphenol, 2-phenoxy-6-methylphenol, etc.

Examples of diphenoquinones having the $R_1$ substituents noted above that I may use are 3,3′,5,5′,-tetramethyldiphenoquinone, 3,3′,5,5′ - tetramethoxydiphenoquinone, 3,3′,5,5′ - tetrabutyldiphenoquinone, 3,3′,5,5′ - tetraacyclohexyldiphenoquinone, 3,3′,5,5′ - tetraphenyldiphenoquinone, 3,3′,5,5′ - tetraphenoxydiphenoquinone, 3,3′-dimethyl - 5,5′ - diphenyldiphenoquinone, 3,3′,5,5′-tetrabenzyldiphenoquinone, 3,3′,5,5′ - tetratolyldiphenoquinone, 3,3′,5,5′ - tetradecyldiphenoquinone, 3,3′,5,5′-tetraeicosyldiphenoquinone, 3,3′ - dimethyl - 5,5′ - dibutyldiphenoquinone, 3,3′ - dimethyl - 5,5′ - diphenyldiphenoquinone, 3,3′ - di-t-butyl-5,5′ - diphenyldiphenoquinone, etc.

The reaction between the phenol and the diphenoquinone occurs very readily in the liquid phase. The liquid phase may be provided by either using an excess of the phenol and using a temperature where the phenol is liquid, or a solvent which is inert under the reaction conditions may be used; for example, hydrocarbons, halogenated hydrocarbons, examples of which are benzene, toluene, tetrachloroethane, the chlorinated benzenes, the chlorinated toluenes, etc. As will be explained later, N-heterocyclic amines catalyze the reaction, and they may be used alone or in conjunction with other solvents as the solvent for the reactants. Since the diphenoquinones are usually relatively insoluble at room temperature in most solvents, the reaction is speeded by heating the solution in order to increase the solubility of the diphenoquinone and thereby hasten the reaction. As is well known, the speed of reaction is usually doubled for every 10-degree rise in temperature. I prefer to hasten the reaction between the phenol and the diphenoquinone by heating the reaction mixture although the reaction will proceed at a very slow rate even at ambient temperatures. This slow rate is occasioned by both the low solubility of the diphenoquinone as well as the slower reaction because of the lower temperature. Therefore, I prefer to heat the liquid phase to a temperature of at least 100° C. up to the decomposition temperature of any of the reactants or the products. Ambient atmospheric pressure can be used or pressures lower or higher than ambient pressure conditions can be used. However, there is no advantage to using less than ambient pressure conditions. Higher than ambient pressure conditions are usually used if temperatures higher than the boiling point at atmospheric conditions of the reaction mixture are being used. However, by proper choice of the solvent to form the liquid phase, desired temperatures can be reached within the range of from 100° C. up to the reflux temperature of the reaction mixture at ambient atmospheric conditions. As will be explained later where ease of isolation of the biphenol is desired, equivalent amounts of the phenol and diphenoquinone (i.e., 2 moles of phenol to 1 mole of diphenoquinone) are used and a solvent in which both the phenol and diphenoquinone and the biphenol product are soluble at the temperature of the reaction is preferably used.

The reaction between the phenol and the diphenoquinone may, if desired, also be hastened by use of catalysts, but such use is not necessary. Both acids and bases are good catalysts, but they must be soluble in the reaction mixture and non-reactive with the reactants and products. Typical basic catalysts which I have found satisfactory are trimethylamine and the N-heteroarylcyclic amines, for example pyridine, alpha-, beta- and gamma-collidine, alpha-, beta- and gamma-picoline, 2,4-, 2,5-, 2,6- and 3,4-lutidine, quinuclidine, the dipyridyls, etc., metal hydroxoxides, i.e., metal alkoxides, e.g., aluminum isopropoxide, potassium isopropoxide, aluminum t-butoxide, etc., and metal phenoxides, e.g., aluminium phenoxide, magnesium phenoxide, etc., are also satisfactory basic catalysts. Since they are also dealkylating catalysts, when they are used to produce biphenols having alkyl substituents of more than one carbon atom, and especially iso- and t-alkyl substituents, the temperature used for the coupling reaction should be lower than that temperature causing the phenol reactant and biphenol product to be dealkylated unless such dealkylated product is desired as disclosed herein. Typical acid catalysts are the carboxyl-substituted hydrocarbons and carboxyl-substituted halohydrocarbons, examples of which are acetic acid, propionic acid, butyric acid, mono-, di and trichloroacetic acid, mono-, di- and tribromoacetic acid, mono-, di- and trifluoroacetic acid, benzoic acid, chlorobenzoic acid, etc. Since it is either the amino group or the carboxyl group which is the active catalyzing agent for the reaction, the balance of the molecule of either the amine or carboxylic acid is not an important part of the molecule.

Catalytic activity is due to the basicity of the amine or acidity of the acid. Therefore, greatest catalytic activity is obtained with the strongest acids or bases. Mineral acids are either reactive with the diphenoquinone or insoluble in the reaction mixture so that they provide little catalytic activity. Partial esters of mineral acids, e.g., mono- and dialkyl esters of phosphoric acid catalyze the reaction but transesterify with the biphenol product. This does not interfere with the catalytic activity but does reduce the yield of biphenol. Aryl substituents on the amino nitrogen decrease the basicity of amines. Aliphatic substituted amines, except trimethylamine, are not satisfactory since, although they catalyze the reaction, they are reactive with the diphenoquinone. Therefore, the amine nitrogen except in trimethylamine, must be part of an aromatic ring, that is, it should be an N-heteroarylcyclic amine, by which term I mean an N-heterocyclic aromatic amine in which the amino nitrogen atom or atoms are tertiary and part of an aromatic ring in which the balance of the molecule is composed of carbon and hydrogen. Such a term excludes amines such as piperidine wherein the nitrogen is part of a cycloaliphatic ring. Because of their suitability and availability, the preferred amine catalysts are trimethylamine and pyridine.

Since the diphenoquinones are such highly colored compounds, whereas the biphenol products are colorless when pure, progress of the reaction is very readily followed by the disappearance of the color caused by the diphenoquinone. Some slight amount of color may remain due to some small amount of by-product formation but this is readily distinguishable from the color due to the diphenoquinone. In order to obtain a maximum yield it is desirable to continue the reaction until the color caused by the diphenoquinone disappears.

In the reaction between the phenol and the diphenoquinone, two molecules of the phenol can be coupled together through the unsubstituted position either ortho or para to the phenolic hydroxy group for each molecule of the diphenoquinone that is reduced to its corresponding biphenol. The reactions involved are an oxidation of the phenol to the corresponding biphenol and a reduction of the diphenoquinone to the corresponding biphenol as illustrated by the following equations where R and $R_1$ are as previously defined for the phenol and diphenoquinone, except that R is other than hydrogen, i.e., is the same as $R_1$.

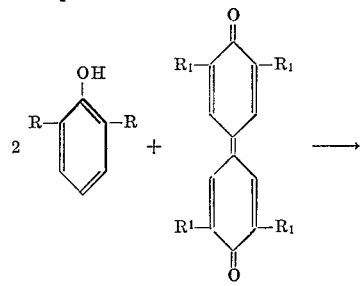

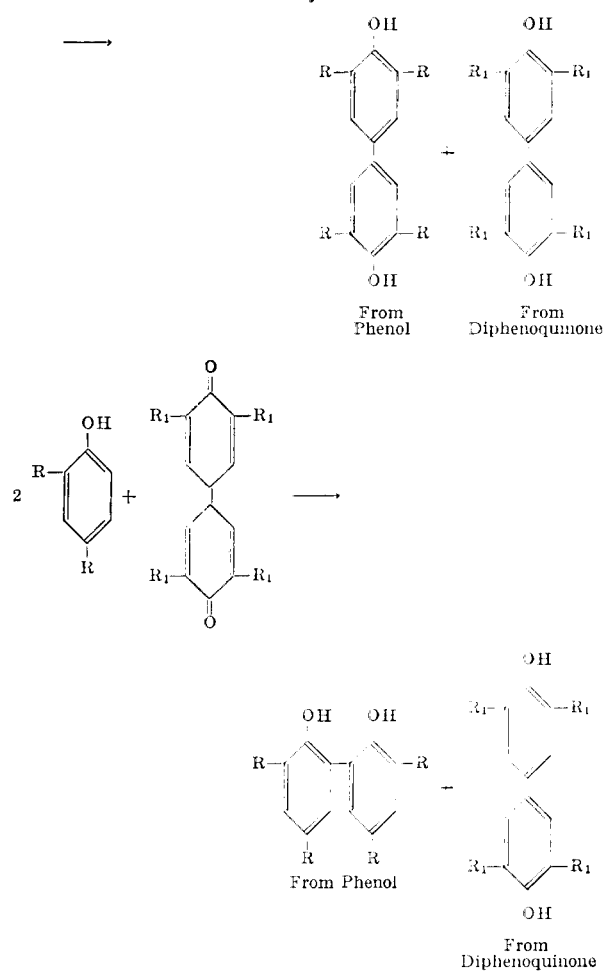

If both ortho and para positions of the phenol are unsubstituted, i.e., one R is hydrogen and the other R is hydrogen or is in the ortho position, then the product from the phenol will be a mixture of the three possible biphenols where coupling has occurred through the 2,2'-, 2,4'- and 4,4'-positions. Para-substituted phenols and di-substituted phenols produce only a single biphenol when they are the sole phenol reactant.

It is also readily seen that if one or more phenols are reacted with one or more diphenoquinones, a mixture of biphenols will be produced which is all of the possible combinations of the reactants. For example, a mixture of 2,6-dimethylphenol and 2,6-diethylphenol reacted with a mixture of 3,3',5,5'-tetra-t-butyldiphenoquinone and 3,3',5,5'-tetraphenyldiphenoquinone will produce a mixture of 2,2',6,6'-tetramethyl-p,p'-biphenol, 2,2',6,6'-tetraethyl-p,p'-biphenol and 2,6-dimethyl-2',6'-diethyl-p,p'-biphenol from the two phenols and 2,2',6,6'-tetra-t-butyl-p,p'-biphenol and 2,2',6,6'-tetraphenyl-p,p'-biphenol from the two diphenoquinones, etc.

If the phenol has two unsubstituted positions ortho or para to the phenolic hydroxyl group and more than 1 mole of diphenoquinone is used to 2 moles of phenol, then there is some coupling of more than two molecules of phenol together to form terphenols and higher condensed products. This reaction cannot occur with the disubstituted phenols or if phenol or the monosubstituted phenols are used in excess, e.g., as the solvent. The terphenols and higher condensed phenols can also be used as antioxidants and as cross-linking reactants in polyester and polycarbonate resins.

There is some side reaction occurring which produces a small amount of by-product wherein coupling has occurred through the hydroxyl group of the phenol forming the oxygen-coupled phenoxyphenol isomers. However, as the bulkiness of the substituents on the phenol increases, i.e., the phenol is a so-called hindered or cryptophenol, this side reaction is suppressed. For example, when 2,6-di-t-butylphenol is reacted with a tetrasubstituted diphenoquinone the only products formed are the 2,2',6,6'-tetra-t-butyl-p,p'-biphenol from the phenol and the biphenol from the diphenoquinone so that if the latter is 3,3',5,5'-tetra-t-butyl diphenoquinone, then the identical biphenol is produced from both the phenol and diphenoquinone.

Since the utilization of the biphenols as stabilizers does not require that the biphenols be pure chemicals and also since in the preparation of polyesters and polycarbonates it is many times desirable to form copolymers, those phenols which lead to mixed products as described above can be used as such, either as stabilizers or for forming the polyesters or polycarbonates. However, the mixtures may be separated into the individual components, if desired, by well-known techniques, such as by distillation, fractional crystallization, etc. If a single biphenol is desired without having to separate a mixture of biphenols, a 2,6-disubstituted phenol is reacted with a diphenoquinone in which the substituents on the phenol are the same as the substituents on the diphenoquinone, e.g., 2,6-dimethylphenol is reacted with 3,3',5,5'-tetramethyldiphenoquinone, 2-t-butyl-6-phenylphenol is reacted with 3,3'-di-t-butyl-5,5'-diphenyldiphenoquinone, etc.

When p,p'-biphenols are the desired product the phenols have the general formula

III

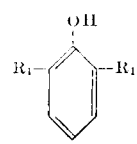

where each $R_1$ is as described above for the diphenoquinones of Formula II. These phenols may be used to first make the diphenoquinones of Formula II as described above and the diphenoquinones then reacted with an additional quantity of the phenols of Formula III so that only this phenol needs to be used as the starting material to produce the p,p'-biphenols.

Where one or both of the $R_1$ substituents of the phenols of Formula III are tertiary alkyl groups, the p,p'-biphenols produced from the phenols by reaction with the diphenoquinones will contain two or four tertiary alkyl groups, i.e., twice the number of the phenol. The p,p'-biphenols so produced can be dealkylated to produce p,p'-biphenol, itself if all four substituents are tertiary alkyl groups or 2,2'-disubstituted p,p'-biphenols if only two of the substituents are tertiary alkyl groups. Since any alkyl group having two or more carbon atoms will have some tendency to be removed if it is the other substituent, thereby leading to a mixture of products, I prefer that the other substituents, if present, be methyl or phenyl. Since the dealkylation reaction converts the tertiary alkyl group to the corresponding alkene, I prefer that the tertiary alkyl group have no more than 8 carbon atoms so that the alkene can be readily separated from the reaction mixture during the dealkylation step. For the same reasons, I prefer that the substituents on the diphenoquinone be those of the phenol and also that the diphenoquinone produces the same p,p'-biphenol as the phenol.

For these reactions the phenol is a 2,6-disubstituted phenol having the formula

IV

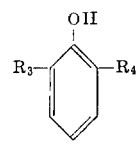

where $R_3$ is a monovalent tertiary alkyl radical having no more than 8 carbon atoms and $R_4$ is the same as $R_3$ and in addition methyl and phenyl, and the diphenoquinone is a 3,3',5,5'-tetrasubstituted diphenoquinone having the formula

V

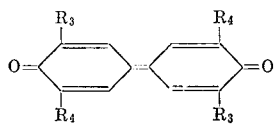

where $R_3$ and $R_4$ are as defined above for the phenol, to produce biphenols corresponding to the formula

VI

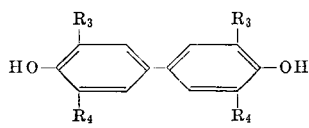

where $R_3$ and $R_4$ correspond to the substituents in the starting phenol and diphenoquinone. In this reaction, both the phenol and diphenoquinone, are converted to the biphenol. As will be explained later, the biphenol produced from the phenol can be identical or different from the biphenol produced from the diphenoquinone. These biphenols may be dealkylated to produce the biphenols wherein the tertiary alkyl groups have been removed.

The alkene obtained in the dealkylation step can be used to alkylate phenol or 2-substituted phenols to produce the phenol of Formula III and especially o-cresol and o-phenylphenol, to produce the phenols of Formula IV. By the above reactions phenol and 2-substituted phenol may be converted to their corresponding p,p'-biphenols. When phenol, o-cresol and o-phenylphenol are used to make the phenols of Formula IV, the corresponding p,p'-biphenols will have the formula

VII

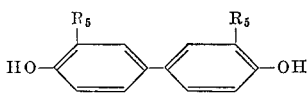

where $R_5$ is a monovalent radical selected from the group consisting of hydrogen, methyl and phenyl.

In producing these biphenols corresponding to Formula VII above, I may either start with a 2,6-disubstituted phenol within the scope of Formula IV, or I may, if desired, start with a phenol having the formula

VIII

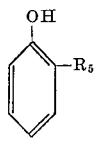

where $R_5$ is the same as defined for the biphenol of Formula VII. Examples of such phenols are phenol itself, o-cresol (2-methylphenol) and o-phenylphenol (2-phenylphenol). These phenols are reacted with an olefin having from 4 to 8 carbon atoms which are tertiary-alkyl group precursors in the presence of an ortho-directing alkylation catalyst under alkylating conditions, thereby producing the 2,6-disubstituted phenols of Formula IV.

By the term "tertiary-alkyl group precursor," sometimes called "tertiary base olefin," I mean an olefin which, when used as an alkylating agent, produces a tertiary alkyl substituent on the other reactant. These tertiary alkyl group precursors are olefins which have a tertiary carbon atom connected to the olefinic double bond, i.e., there is no hydrogen on one of the carbons attached to the olefinic double bond, as illustrated by the following two formulas where the $R_a$ is an alkyl group:

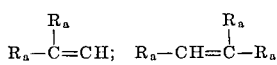

Examples of such tertiary-alkyl precursors having from 4 to 8 carbon atoms are isobutene (2-methylpropene), the 2-isoamylenes, i.e., 2-methylbutene-1 and 2-methylbutene-2, 2-methylpentene-1, 2-methylpentene-2, 2-ethylbutene-1, 2-ethylbutene-2, 2,3-dimethylbutene-1, 2-methylhexene-1, 2-methylheptene-1, etc.

The reaction of a phenol with a tertiary-alkyl group precursor as well as the dealkylation of the alkylated phenol to produce the dealkylated phenol and the olefin is an equilibrium reaction in which the alkylation reaction is favored by the use of superatmospheric pressures, and relatively low temperatures, whereas the dealkylation reaction is favored by the use of atmospheric or subatmospheric pressure and high temperature. However, not all catalysts are ortho-directing in the alkylation process. Those alkylation catalysts which are ortho-directing for the alkylation process are the phenoxy derivatives of such elements as aluminum, magnesium, iron, zinc, phosphorus, zirconium, titanium, bismuth, tin, etc., where the phenoxy moiety may be the phenoxy radical itself, the cresoxy radical, the xyloxy radical, etc. The preferred phenoxy derivatives are those of aluminum and magnesium, with aluminum being somewhat preferable to that of magnesium. For the dealkylation reaction, either the above ortho-directing alkylation catalysts may be used or the acids or acid salts, for example, sulfuric acid, acidified clays, aluminum chloride, zinc chloride, etc., which are predominantly para-directing catalysts when used as an alkylation catalyst, may be used for the dealkylation reaction.

Since the reaction with the tertiary-alkyl group precursor and the phenol is an equilibrium reaction, the alkylation step is favored by those reaction conditions which maintain the olefin in contact with the phenol, for example, use of pressure if the olefin is a gas, whereas a dealkylating reaction is favored by those reaction conditions which expel the olefin from the reaction vessel, for example, distillation or reduction of pressure, with venting of the gas from the vessel. Both reactions are usually favored by use of heat and/or the use of larger amounts of catalyst. Generally, for the alkylation reaction, pressure is used for those alkylating agents which are gases at the temperature of the reaction, with the pressure being determined by the autogenous pressure of the particular olefin under the reaction conditions. The conditions and the carrying out of the alkylation of phenols and the dealkylation of phenols is well known in the art and details may be found, for example, in U.S. Pat. 2,831,898—Ecke et al., issued Apr. 22, 1958, U.S. Pat. 2,923,745—Buls et al., issued Oct. 21, 1957, and British Pat. 776,204, issued June 5, 1957. Dealkylating conditions are more fully described, for example, in the U.S. 3,091,646—Leston, issued May 28, 1963.

Phenols corresponding to Formula IV which I may use directly or prepare by the alkylation of phenol, ortho-cresol or ortho-phenylphenol, are, for example, 2,6-di-t-butylphenol, 2,6-di-t-amylphenol, the isomeric 2,6-di-t-hexylphenols, i.e., 2,6-bis(1,1 - dimethylbutyl)phenol and 2,6-bis(1-methyl-1-ethylpropyl)phenol, the isomeric 2,6-di-t-heptylphenols, the isomeric 2,6-di-t-octylphenols, 2-t-butyl-6-methylphenol, 2-t-butyl - 6 - phenylphenol, 2-t-amyl - 6 - methylphenol, 2-t-amyl - 6 - phenylphenol, 2-t-hexyl - 6 - methylphenol, 2-t-heptyl-6-phenylphenol, 2-t-octyl-2-methylphenol, etc. These phenols are reacted in a liquid phase with a 3,3',5,5'-tetrasubstituted diphenoquinone as previously described.

Diphenoquinones in all of the above reactions, i.e., with any of the phenols of Formula I, III or IV, may be made by any of the prior known processes, but are much more conveniently prepared and in higher yields by reacting a 2,6-disubstituted phenol corresponding to Formula III or IV with oxygen in a solution of an amine basic cupric salt complex in which the phenol is soluble, or in the presence of a complex of a basic cupric salt with a cyano-substituted hydrocarbon, or an N,N-di-(monovalent hydrocarbon) carbamoyl-substituted hydrocarbon in which the phenol is soluble.

In providing the catalyst comprising a complex of a basic cupric salt and the nitrile, amide or amine, the particular copper salt used has no effect on the type of product obtained. I may start with either a cuprous or a cupric salt. The only requirement is that, if a cuprous salt is used, it must be capable of existing in the cupric state and must form a complex that is soluble in the reaction medium.

The necessity for being able to exist in the cupric state is based on my belief that the oxidation of the phenol is accomplished by the oxygen reacting with the cuprous salt complex with the nitrile, amide or amine, to form an intermediate, activated, basic cupric salt complex of the nitrile, amide or amine, which reacts with the phenol to form an unstable intermediate which decomposes, forming the diphenoquinone and water as the products and regenerates the cuprous salt complex of the nitrile, amide or amine.

This activated complex can also be formed by starting originally with a cupric salt in making the copper complex, for example, by using a reducing agent which unites with the liberated anion and forms the cuprous salt in situ, e.g., copper metal. However, more simple methods may be used, for example, the activated complex may be formed by adding cupric hydroxide to a cupric salt, adding a base to a cupric salt, by treating a cupric salt with an ion exchange resin having exchangeable hydroxyl groups, etc. Preferably, these reactions are carried out in the presence of the nitrile, amide, or amine to prevent precipitation of the basic cupric salt, but it is possible to add the nitrile, amide or amine later to dissolve the basic cupric salt even as a precipitate. As will be obvious, the amount of hydroxyl ion introduced into the complex should not be sufficient to convert the cupric salt to cupric hydroxide, unless additional cupric salt is added later to form the basic cupric salt.

Typical examples of a copper salt suitable for forming the complex are cuprous chloride, cupric chloride, cuprous bromide, cupric bromide, cuprous sulfate, cupric sulfate, cuprous azide, cupric azide, cuprous tetraamine sulfate, cupric tetraamine sulfate, cuprous acetate, cupric acetate, cuprous propionate, cupric butyrate, cuprous palmitate, cupric laurate, cuprous benzoate, cupric toluate, etc., cuprous chloride, cupric chloride, cuprous bromide, cupric bromide, cuprous azide and cupric azide produce the most active catalysts. Although cupric sulfite is not known, cuprous sulfite can be used because it evidently is oxidized to cuprous sulfate. Copper salts such as cuprous iodide, cuprous sulfide, cupric sulfide, cuprous cyanide, cuprous thiocyanate, etc., are not suitable, since they either do not form soluble complexes with the nitrile, amides or amines, or are not capable of existing as stable cupric salts, for example, cupric cyanide and cupric thiocyanate autogenously decompose to a corresponding cuprous salt. Cuprous nitrate and cuprous chloride are not known to exist but the nitrile, amide or amine complexes can be made in situ. Substitution of cupric chloride, cupric sulfate, cupric perchlorate, and cupric nitrate for the cuprous salt without first converting them to the corresponding basic cupric salt, did not catalyze the oxidation of the 2,6-disubstituted phenols to diphenoquinones.

Examples of nitriles or cyano-substituted hydrocarbons which may be used for forming the complex are those corresponding to the formula R'(CN)$_x$ where R' is a hydrocarbon radical, e.g., alkyl (including aralkyl, cycloalkyl), alkylene, alkenyl, alkynyl, aryl (including alkaryl), arylene, etc., and X is an integer and is at least one up to the total number of replaceable hydrogens on R'. Preferably, R' is alkyl or aryl and X is 1 to 2. Specific examples are: the aliphatic nitriles, for example, acetonitrile, acrylonitrile, propionitrile, butyronitrile, valeronitrile, capronitrile, stearonitrile, including those containing two or more nitrile groups, for example, malononitrile, succinonitrile, maleonitrile, adiponitrile, itacononitrile, citronitrile, etc., and the arylnitriles, for example, benzonitrile, tolunitrile, naphthonitrile, etc., including those arylnitriles and amides having two or more nitrile groups substituted thereon, for example, phthalonitrile, isophthalonitrile, N,N-dimethyl-p-cyanobenzamide, trimellitonitrile, trimesonitrile, etc. Also included in the aliphatic series are those cycloaliphatic nitriles, for example, cyclohexanonitrile, cycloheptanonitrile, etc., as well as those aryl-substituted aliphatic nitriles, for example, phenylacetonitrile, naphthylacetonitrile, etc.

Examples of the tertiary amides or tertiary carbamoyl substituted hydrocarbons which may be used in practicing my invention are those corresponding to the general formula

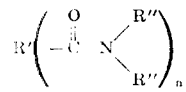

where R' and $n$ are as defined above for the nitriles, and each R" is the same or different monovalent hydrocarbon radical, e.g., alkyl, alkenyl, alkynyl, aryl, etc. Preferably, R' is alkyl or aryl and R" is alkyl. Specific examples are: N,N-dimethylacetamide, N,N-diethylacetamide, N,N-dimethylbenzamide, N,N-dimethylcyclohexanamide, N-methyl-N-ethylacetamide, N,N-dimethylbutyramide, N,N-diethylpropionamide, N,N-hexylacrylamide, N,N-dipropylmaleamide, N-phenyl-N-cyclohexylvaleramide, N,N-dimethylisophthalamide, N,N-dimethylnaphthamide, N,N,N',N'-dimethylisophthalamide, etc.

Examples of amines which are free of aryl substituents directly bonded to the amine introgen that may be used in practicing my invention are the aliphatic amines, including cycloaliphatic amines wherein the cycloaliphatic group is substituted on the amine nitrogen, for example, mono-, di- and trimethylamine, mono-, di- and triethylamine, mono-, di- and tripropylamine, mono-, di- and tributylamine, mono-, di- and trisecondary-propylamine, mono-, di- and tribenzylamine, mono-, di- and tricyclohexylamine, mono-, di- and triethanolamine, ethylmethylamine, methylpropylamine, allylethylamine, methylcyclohexylamine, morpholine, methyl-n-butylamine, ethylisopropylamine, benzylmethylamine, octylbenzylamine, octylchlorobenzylamine, methylcyclohexylamine, methylphenethylamine, benzylethylamine, di(chlorophenethyl)amine, 1-methylamino-2-phenylpropane, 1-methylamino-4-pentene, N-methyldiethylamine, N-propyldimethylamine, N-allyldiethylamine, 3-chloro-N,N'-dimethylpropylamine, N-butyldimethylamine, N-isopropyldiethylamine, N-benzyldimethylamine, N-benzyldioctylamine, N-chlorobenzyldioctylamine, N-cyclohexyldimethylamine, N-phenethyldimethylamine, N-benzyl-N-methylethylamine, N-bromobenzyl di(chlorophenethyl)amine, N,N-dimethyl-2-phenylpropylamine, N-dimethyl-4-pentenyl amine, N,N-diethyl-2-methylbutyl amine, etc. When aliphatic amines are used, I prefer that the aliphatic groups be straight chain hydrocarbon groups.

Examples of cyclic amines are the pyridines, such as pyridine itself, $\alpha$-, $\beta$- and $\gamma$-collidine, $\alpha$-, $\beta$- and $\gamma$-picoline, and 2,4-, 2,5-, 2,6- and 3,4-lutidine, quinuclidine, the dipyridyls, the pyrroles, the pyrrolidines, the piperidines, the diazoles, the triazoles, the diazines, the triazines, the quinolines, the diquinoyls, the isoquinolines, the tetrahydroquinolines, the tetrahydroisoquinolines, the phenanthrolines, the morpholines, etc., including the ring-substituted products of these cyclic amines whereby one or more of the hydrogen atoms on the carbons forming the ring are substituted by groups which may be aliphatic (for example, methyl, ethyl, vinyl, propyl, propenyl, butyl, amyl, hexyl, heptyl, octyl, etc., and isomers and the homologues thereof), alkoxy (for example, methoxy, ethoxy, vinyoxy, propoxy, propenoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that secondary cyclic amines, e.g., piperidines, pyrroles, pyrrolidines, tetrahydroquinolines, tetrahydroisoquinolines may also be used in the form of tertiary amines whereby an alkyl hydrocarbon radical, such as those listed above for the ring substituents, is attached to the amine nitrogen group, e.g., N-methylpyrrole, N-methyl tetrahydroquinoline, N-methyl tetrahydroisoquinoline, N-methyl piperidine, N-methyl pyrrolidine, N-methylimidazole, N-methyl-1,2,4-triazole, N-decylpiperidine, N-decylpyrrolidine, N-isobutylpiperidine, 1-decyl-2-methylpiperidine, N-isopropylpyrrolidine, N-cyclohexylpiperidine, etc.

In general, primary, secondary, tertiary, mixed primary-secondary, mixed primary-tertiary or mixed secondary-tertiary polyamines would behave in the same way as primary, secondary and tertiary monoamines in my reaction, except of course, the amount used would only have to be that amount necessary to give the equivalent amount of amino groups. I may use polyamines wherein two or more amine groups, of the kind listed above for the monoamines, are attached to an aliphatic or cycloaliphatic nucleus e.g., ethylene, diethyleneamine, propylene, butylene, pentylene, hexylene, cyclopentylene, cyclohexylene, etc. Typical examples of these aliphatic polyamines are the N,N-dialkylethylenediamines, N,N,N'-trialkylethylenediamine, propanediamine, ethylenediamine, the N-alkylethylenediamines, the N-alkylpropanediamine, the N,N'-dialkylpropanediamine, the N,N,N' - trialkylpropanediamines, propanediamine, the N-alkylpropanediamines, the N,N'-dialkylbutanediamines, pentanediamine, the N-alkylpentanediamines, the N,N'-dialkylpentanediamines, the N,N,N'-trialkylpentanediamines, diethylenetriamine, the N-alkyldiethylenetriamines, the N'-alkyldiethylenetriamines, the N,N',N''-trialkyldiethylenetriamines, the N,N',N'-trialkyldiethylenetriamines, the N,N',N'-trialkyldiethylenetriamines, the N,N,N',N''-tetraalkyldiethylenetriamines, the N',N',N'',N''-tetraalkyldiethylenetriamines, the cyclohexylenediamines, etc. Likewise the polyamines may be mixed aliphatic and cyclic amines, e.g., aminoalkylpyridines, alkylaminoalkylpyridines, etc. I have, however, discovered that those polyamines which have only two or three aliphatic or cycloaliphatic carbon atoms separating the two primary or secondary amino nitrogens represent a class of polyamines which are strong chelating agents and form complexes with the copper salt which so completely envelop the copper that the complex is less reactive than the other aliphatic primary or secondary amines in the oxidation reaction. Because of this, I prefer, when using primary or secondary amines, to use primary and secondary monoamines. However, this is not true of tertiary polyamines. Typical examples of such tertiary amines are:

N,N,N',N'-tetramethylethylenediamine,
N,N,N',N'-tetraethylethylenediamine,
N,N,N',N',N'-tetrapropylethylenediamine,
N,N,N',N'-tetrabutylethylenediamine,
N-butyl-N-octyl-N',N'-dimethylenediamine,
N¹,N¹-dibenzyl-N²,N²-dimethyl-1,2-propanediamine
2-chloro-N,N,N',N'-tetraethyl-1,3-propanediamine,
N'-(3-chloro-p-tolyl)-N,N-diethyl-N'-methyl-1,3,2-
 (β-dimethylaminoethyl)pyridine,
N,N,N',N'-tetrabenzyl-3-butene-1,2-diamine,
N,N,N',N'-tetramethyl-2-butyne-1,4-diamine,
N,N,N',N'-tetraalylputrescine,
N,N,N',N'-tetraisobutylethylenediamine,
N,N,N',N'-tetraisopropyl-1,3-butanediamine,
N,N,N',N'-tetramethyl-1,3-cyclopentanediamine,
N,N,N',N'-tetramethyl-1,4-cyclohexanediamine, etc.,
N-ethyl-N,N',N'-trimethylethylenediamine,
N-methyl-N,N',N'-triethylethylenediamine,
N,N,N',N'-tetramethyl-1,3-propanediamine,
N,N-dimethyl-N',N'-diethylethylenediamine
1,2-bis(2-methylpiperidino)-ethane,
N,N,N',N'-tetra-n-hexylethylenediamine,
N,N,N',N'-tetra-n-amylethylenediamine,
1,2-bispiperidinoethane,
N,N,N',N'-tetramethyl-1,4-diphenylputrescine,
N,N N',N'-tetraisobutylethylenediamine,
N,N,N',N'-tetramethyl-1,3-butanediamine,
N,N,N',N'-tetramethyl-1,2-cyclohexanediamine,
1,2-bis(2,6-dimethyliperidino)ethane,
N,N-didecyl-N' N'-dimethylethylenediamine,
N-methyl-N',N',N'',N''-tetraethyldiethylenetriamine,
N-decyl-N,N',N'-triethylethylenediamine,
2-(β-piperidinoethyl)-pyridine,
2-(β-dimethylaminoethyl)-6-methylpyridine,
2-(β-dimethylaminoethyl)pyridine,
2-(β-morpholinoethyl)-pyridine; etc.

In general, tertiary amines are more oxidatively stable than primary and secondary amines. Also, my studies have shown that tertiary amines form a complex which is a more active catalyst for the oxidative coupling reaction forming the basis of this application. Therefore, I prefer tertiary amines as the amine to be used in forming the amine-basic cupric salt complex.

Many factors affect the stability of the complex of the amine and the copper salt. These factors are well known in the art and are discussed in detail in such texts as "The Chemistry of the Coordination Compounds" edited by John C. Bailar, Jr. Reinhold Publishing Corp., New York, 1956, see for example pages 174 to 190; and "Mechanisms of Inorganic Reactions," Fred Basolo and Ralph G. Pearson, John Wiley and Sons, Inc., New York, 1958, see for example pages 14–24. As pointed out in the latter text on page 18, one of the major factors influencing stability is the basicity of the ligand. I have found that apparently the ability to form a stable complex is indicated by the basicity of the amines I use as ligand also is an indication of the activity of the catalyst. Those amines which are strong bases form more active catalysts than amines which are weak bases. When the latter are used, typical examples of which are 3,5-diphenylpyridine, phenanthridine, etc., I find that heating of the reaction mixture is desirable to cause the self-condensation reaction to proceed rapidly.

The effect of an N-aryl group in amines e.g., aniline, N-methylaniline, N,N-dimethylaniline, methyldiphenylamine, etc., is to reduce the basicity of the amine so that its ability to form the copper complex is greatly reduced. Further, the stability of the amine under oxidizing conditions is greatly reduced. Because of these two effects I prefer to use amines which are free of N-aryl substituents.

Although I do not want to be bound by my theory, I believe that the copper salt forms a complex with the nitrogen in the amine, amide or nitrile. Because, generally, amides and nitriles are more weakly basic than amines, they do not form as strong complexes as amines. To overcome this, larger amounts of nitriles or amides are required. The amount required is dependent not only on the particular amides or nitrile but also on the reaction medium. Sufficient amide or nitrile should be used that the complex it forms with the copper salt is soluble in the reaction medium. Larger quantities of the nitrile or amide can be used even up to the quantity that it becomes the sole solvent for the phenol and copper salt. The exact structure of the complex and the structure of the intermediate formed with the phenols are unknown at the present time. However, it is known that the soluble complex formed from a cuprous salt and the nitrile or amide can react with oxygen to form an oxidized intermediate while the soluble complex formed from a cupric salt is already in the form of the oxidized intermediate which in some manner can form a complex with the phenol. In producing the diphenoquinones, oxygen or other oxygen-containing gas, e.g. air, etc., is reacted with a solution of the 2,6-disubstituted phenols dissolved in a suitable solvent inert to the oxidizing conditions in the presence of the dissolved basic cupric salt complex with the amine, amide or nitrile.

This reaction may be carried out conveniently at atmospheric pressure at ambient temperature up to the reflux temperature of the reaction mixture if either the phenol has at least one tertiary alkyl substituent (see my U.S. Pats. 3,306,874, and 3,306,875) or the complex of basic cupric salt is formed from a cyanosubstituted hydrocarbon or an N,N-di-(monovalent hydrocrabon) carbamoyl-substituted hydrocarbon (see my U.S. Pat. 3,210,384. When the phenol is a 2,6-diarylphenol and catalyst is an amine-basic cupric salt complex, then the reaction is carried out at temperatures below 40° C. to prevent the phenol being oxidized to a polymer as taught in my copending application Ser. No. 593,733, now U.S. Pat. 3,432,466. When the phenol has no tertiary alkyl substituted or both substituents are not aryl, alkoxy or aryloxy, and the catalyst is an amine-basic salt complex, then the reaction is carried out at temperature of 80° C. up to reflux temperature of the reaction mixture to prevent the phenol from being oxidatively coupled to a polyphenylene ether as taught in my copending application, Ser. No. 212,128, now U.S. Pat. 3,306,875 referred to above.

In making these diphenoquinones by this means, the water which is a by-product should not be allowed to form a separate layer since this will extract the catalyst and inactivate it. To prevent this, several means can be used. For example, a solvent system can be used which is miscible with the catalyst and water, dessicants can be used to remove the water, the oxygen containing gas stream can be allowed to sweep the water from the reaction mixture, and, where the reaction is run at elevated temperatures, the water can be distilled or azeotroped from the reaction mixture.

Within these parameters, subatmospheric or superatmospheric pressures and temperatures, lower than ambient conditions, or by the use of pressure, temperatures higher than will cause reflux at atmospheric pressure, may of course be used, but there is no incentive for the use of such conditions in preference to ambient up to reflux temperature conditions at atmospheric pressure, since the lower temperatures and pressures decrease the reaction rate and the higher cost of pressure equipment is not justified by the somewhat faster reaction rate.

The overall oxidation is shown in the following schematic diagram:

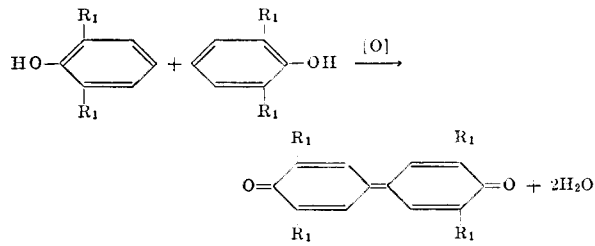

where $R_1$ is as previously defined.

It is to be understood that the reaction is not a direct oxidation as illustrated, but an oxidation involving participation of the copper catalyst system as an oxygen-carrying intermediate. Because of the insolubility of the diphenoquinone, it precipitates from the reaction mixture at room temperature and may be easily filtered from the balance of the reaction mixture and the catalyst system. If desired, the diphenoquinone product may be dissolved and re-crystallized in hot solvents such as acetic acid, chloroform, chlorinated hydrocarbons, pyridine, etc.

Further details of this reaction for forming the diphenoquinones may be found in my copending applications referred to above.

From the above discussion, it will be seen that the substituents on the diphenoquinone will be the same as the substituents which were on the starting phenol, i.e., 2,6-di-t-butylphenol would produce 3,3',5,5'-tetra-t-butyldiphenoquinone. Therefore, the diphenoquinones that would be produced by this reaction would correspond to the phenols listed above. Typical examples of such diphenoquinones have been given previously. Some more examples of diphenoquinones that are especially useful for making the biphenols that can be dealkylated are 3,3',5,5' - tetra-t - amlydiphenoquinone, 3,3',5,5' - tetra-t-hexyldiphenoquinone, 3,3',5,5' - tetra-t - heptyldiphenoquinone, 3,3',5,5'-tetra-t-octyldiphenoquinone, 3,3'-di-t-butyl - 5,5' - dimethyldiphenoquinone, 3,3'-di-t-butyl-5,5'-diphenyldiphenoquinone, etc.

Since, as previously discussed, the metal alkoxides and metal phenoxides are dealkylation catalysts, they are particularly desirable for use in causing the coupling reaction btween the phenols of Formula IV and the diphenoquinones of Formula V when it is also desirable to carry out the dealkylation step at the same time as the reaction forming the biphenol. However, in carrying out this reaction, it is usually desirable first to carry out the coupling reaction at lower temperatures and also preferable to use pressure to cause the coupling reaction to go to completion and thereafter raise the temperature and reduce the pressure to cause the dealkylation reaction to proceed. On the other hand, if it is desirable first to isolate the tetrasubstituted biphenol before carrying out the dealkylation it is preferable to use the amine catalyst for the condensation reaction which only causes the coupling reaction to occur, followed by the dealkylation reaction. As previously explained, the conditions and catalysts for causing the dealkylation are well known to those versed in the art, and are generally referred to as carrying out the dealkylation under dealkylating conditions.

In order that those skilled in the art may better understand how my invention may be practiced, the following examples are given by way of illustration and not by way of limitation. All parts are by weight unless otherwise stated.

EXAMPLE 1

A mixture of 1.29 parts 3,3',5,5'-tetra-t-butyldiphenoquinone, 1.5 parts 2,6-di-t-butylphenol and 1 part of pyridine were placed in a glass tube which was then flushed with nitrogen and sealed. The tube was place in a furnace heated at 250° C. Periodically, the tube was inverted to keep the reaction mixture agitated. After 10 minutes, the reaction mixture which at first was deep red in color became pale yellow, indicating that the reaction had been completed. After cooling, the tube was opened and the reaction mixture removed and dissolved in ether. The ether solution was washed with dilute hydrochloric acid to remove the pyridine, the ether layer was separated, and the ether evaporated. The reaction mixture was then dissolved in hot ethanol which on cooling deposited 2.51 parts of pure 2,2',6,6'-tetra-t-butyl-p,p'-biphenol having a melting point of 186° C. This material showed no depression in melting point when mixed with an authentic sample of 2,2',6,6'-tetra-t-butyl-p,p'-biphenol.

When Example 1 was repeated using a temperature of 225° C., the reaction was completed in 20 minutes.

When Example 1 was repeated using 1 part by volume of trifluoroacetic acid in place of the pyridine and a temperature of 240° C., the reaction was completed in less than 10 minutes. In this case, a slight pressure was created in the sealed tube indicating that a small amount of dealkylation of the tertiarybutyl groups had occurred. Use of a lower temperature suppresses the dealkylation reaction.

EXAMPLE 2

A mixture of 50 parts of 2,6-diisopropylphenol, 1 part by volume of pyridine and 10 parts of 3,3',5,5'-tetraisopropyldiphenoquinone were heated at a temperature of 170° C. at reflux conditions. The highly colored solution became almost colorless in 1 hour. The biphenol product was separated from the excess 2,6-diisopropylphenol by crystallization from n-heptane. The yield was 16 parts of 2,2'-6,6'-tetraisopropyl-p.p'-biphenol having a melting point of 115–117° C., which showed no depression in melting point with an authentic sample of the biphenol.

Example was repeated using the sealed glass tube technique as described in Example 1. In this case, a mixture of 2 parts by weight of 3,3',5,5'-tetraisopropyldiphenoquinone, 2.2 parts of 2,6-diisopropylphenol and 1 part by volume of pyridine were heated at 230° C. The highly colored reaction mixture was decolorized in less than 10 minutes. The 2,2',6,6'-tetraisopropyl-p,p'-biphenol was isolated from the reaction mixture by the work-up procedure described in Example 1. When pyridine was omitted from this reaction mixture, in the sealed tube, the reaction proceeded as shown by the reaction mixture becoming decolorized in a period of 10 minutes at 230° C. The 2,2',6,6'-tetraisopropylbiphenol again was isolated by the procedure described in Example 1.

EXAMPLE 3

Using the sealed tube technique described in Example 1, a mixture of 1.2 parts of 3,3',5,5'-tetramethyldiphenoquinone, 2 parts of 2,6-dimethylphenol and 3 parts by volume of pyridine were heated to 200° C. The reaction mixture immediately became colorless. Analysis of the product showed that the reaction mixture contained both 2,2',6,6'-tetramethyl-p,p'-biphenol and 4-(2,6-dimethylphenoxy)-2,6-dimethylphenol, in the ratio of 7 parts of the former to 1 part of the latter. When this reaction was repeated, except omitting the pyridine, the heating required was slightly over 30 minutes to proceed to completion.

The above reaction was repeated using 5.2 parts of 2,6-dimethylphenol, 5 parts of 3,3',5,5'-tetramethyldiphenoquinone dissolved in 100 parts by volume of pyridine. The reaction was carried out at the reflux temperature of the reaction mixture and required 5 minutes for the reaction mixture to become colorless. The biphenol was precipitated from the pyridine by adding a large quantity of water. After filtering, the solid material was crystallized from heptane to yield 6.1 parts of 2,2',6,6'-tetramethyl-p,p'-biphenol, identified by its mixed melting point with an authentic sample.

The reaction was also carried out using the excess 2,6-dimethylphenol as the solvent. In this case, the reaction mixture contained 50 parts of 2,6-dimethylphenol, 10 parts of 3,3',5,5'-tetramethyldiphenoquinone, and 1 part by volume of pyridine. The reaction mixture became colorless after heating for 30 minutes at 150° C. Recrystallization of the product from heptane yielded 16.5 parts of 2,2',6,6'-tetramethyl-p,p'-biphenol.

EXAMPLE 4

Using the sealed tube technique as described in Example 1, 1.8 parts of phenol, 2.04 parts of 3,3',4,4'-tetra-t-butyldiphenoquinone and 1 part of pyridine were heated for 40 minutes at 240° C., by which time the reaction mixture had become completely colorless. Analysis of the reaction product showed that the reaction mixture contained 2,2',6,6'-tetra-t-butyl-p,p'-biphenol from the diphenoquinone and the three isomeric biphenols, p,p'-, o,p'- and the o,o'-biphenols as well as the 2 isomeric phenoxy-substituted phenols, p-phenoxy phenol and o-phenoxy phenol, which could be separated into its individual constituents by fractional distillation and fractional crystallization.

EXAMPLE 5

Using the sealed tube technique of Example 1, 1.84 parts of 2-t-butylphenol, 1.88 parts of 3,3',5,5'-tetra-t-butyldiphenoquinone and 1 part by volume of pyridine were heated for 60 minutes at 240° C., by which time the reaction mixture had become colorless. The reaction mixture in this case was a mixture of 2,2',6,6'-tetra-t-butyl-p,p'-biphenol from the diphenoquinone and a mixture of the 3 isomeric biphenols, 2,2'-di-t-butyl-p,p'-biphenol, 2,2'-di-t-butyl-o,p'-biphenol and 2,2'-di-t-butyl-o,o'-biphenol as well as a small amount of the 2 isomeric phenoxy phenols, 4-(2-t-butylphenoxy)-2-t-butylphenol, and 2-(2-t-butylphenoxy)-6-t-butylphenol, from the phenol reactant. This reaction mixture could be separated into its individual constituents by fractional distillation and fractional recrystallization.

EXAMPLE 6

Using the sealed tube technique of Example 1, 2 grams of 3,3',5,5'-tetraphenyldiphenoquinone, 2.1 grams of 2,6-diphenylphenol and 0.2 gram of trimethylamine and 3 ml. of benzene were heated to 145° C. The deep red color of the diphenoquinone disappeared in less than 5 minutes. Previous runs in which pyridine, acetic acid and trifluoroacetic acid had been substituted for the trimethylamine in the above reaction showed that the 2,2',6,6'-tetraphenyl-p,p'-biphenol was difficult to purify by recrystallization. To aid in the purification, the above reaction mixture, after cooling, was added to 10 ml. of acetic anhydride and heated at the reflux temperature for 10 minutes. On pouring the reaction mixture into ice water, the diacetate product precipitated and was removed by filtering. A yield of 4 grams of the diacetate of 2,2',6,6'-tetraphenyl-p,p'-biphenol was obtained. After two recrystallizations, the initial melting point of 175° C. was raised to 206° C. Hydrolysis of the diacetate with ethanol saturated with potassium hydroxide, followed by acidification of the solution produced the free 2,2',6,6'-tetraphenyl-p,p'-biphenol. Recrystallization of the biphenol gave a product having a melting point of 196° C., which shows no depression in melting point with two separate batches of 2,2',6,6'-tetraphenyl-p,p'-biphenol prepared by the reduction of 3,3',5,5'-tetraphenyldiphenoquinone in one case by hydrazine and in the other case by reaction with diphenylmethane as disclosed and claimed in my copending application, Ser. No. 306,300, now U.S. Pat. 3,262,982, filed Sept. 3, 1963 and assigned to the same assignee as the present invention. Duplicate analyses of the biphenol shows that it has 88.30 and 87.94% carbon and 5.28 and 5.28% hydrogen, compared to a theoretical analysis of 88.13% carbon and 5.34% hydrogen for 2,2',6,6'-tetraphenyl-p,p'-biphenol.

Although it is possible to reoxidize some of the 2,2'-6,6'-tetrasubstituted p,p'-biphenols back to the corresponding diphenoquinone which can then be used to couple more of the phenols to the corresponding biphenols, this would actually utilize some of the yield of the biphenol. I prefer, therefore, to produce the diphenoquinones by coupling together 2,6-disubstituted phenols as taught in my copending applications, Ser. Nos. 212,127, now U.S. Pat. 3,306,874, 212,128, now U.S. Pat. 3,306,875, and 239,316, now U.S. Pat. 3,210,384 referred to above. By so doing, the net result will be to use only phenols as the basic starting product.

This provides a two-step process for converting phenols to desirable products using only phenols and air or oxygen as the raw materials. The following examples illustrate this aspect of my invention.

EXAMPLE 7

Oxygen was passed through a vigorously stirred mixture of 125 ml. of acetonitrile and 2 grams of cuprous chloride in a 250 ml. flask, immersed in a 30° C. water bath. When the copper salt had dissolved, 5 grams (0.41 mole) of 2,6-dimethylphenol was added. At the end of 30 minutes reaction time, a red precipitate was removed by filtration, and the filtrate was oxidized for an additional 30 minutes, to produce a second batch of red precipitate. The total yield was 4.6 grams (0.019 mole) or 93% yield, which was identified as 3,3',5,5'-tetramethyldiphenoquinone having a melting point of 224° C.

When this example was repeated using 2-methyl-6-t-butylphenol, the product was identified as 3,3'-dimethyl-5,5'-t-butyldiphenoquinone and was obtained as red colored crystals having a melting point of 217° C. With 2,6-di-t-butylphenol, the product was identified as 3,3',5,5'-tetra-t-butyldiphenoquinone and was obtained as red colored crystals having a melting point of 246° C. Using 2,6-diisopropylphenol, the product was identified as 3,3',5,5'- tetraisopropyldiphenoquinone and was obtained as red colored crystals having a melting point of 225° C.

When 3.4 grams of cupric chloride dihydrate is substituted for the 2 grams of cuprous chloride in the above reaction mixture, no reaction occurs when oxygen is passed into the solution containing the 2,6-dimethylphenol. However, when 1.12 grams of potassium hydroxide is added to the solution, the reaction proceeds in the same manner to produce the same product as when cuprous chloride was used, thus showing that cupric chloride itself is not capable of forming the active catalyst but that the basic cupric chloride functions in the same way as the catalyst prepared from the cuprous chloride.

EXAMPLE 8

Oxygen was passed through a vigorously stirred solution of 135 ml. of benzonitrile and 2 grams of cuprous chloride in a 250 ml. flask heated on a steam bath. After the cuprous chloride was all dissolved, 10 grams (0.082 mole) of 2,6-dimethylphenol was added. At the end of 50 minutes, a copious red precipitate was separated by filtration and dried yielding 8.2 grams (0.034 mole, 83% yield) which was identified as 3,3',5,5'-tetramethyldiphenoquinone having a melting point of 224° C.

EXAMPLE 9

Oxygen was passed through a vigorously stirred solution of 135 ml. of N,N-dimethylacetamide and 1 gram of cuprous chloride contained in a 250 ml. Erlenmeyer flask heated on a steam bath. After the cuprous chloride had dissolved, 10 grams (0.082 mole) of 2,6-dimethylphenol was added. At the end of 40 minutes reaction time, there was a copious red precipitate. After cooling to 25° C., the solvent was removed by filtration, washed with alcohol, and dried, yielding 7.8 grams (0.033 mole, 79% of theory) of a compound which was identified as 3,3',5,5'-tetramethyldiphenoquinone having a melting point of 224° C.

EXAMPLE 10

Oxygen was bubbled through a vigorously stirred solution of 2 grams of cuprous chloride, 125 ml. of acrylonitrile and 10 grams of 2,6-dimethylphenol for 3 hours. The reaction mixture was filtered to isolate the product, identified as 3,3',5,5'-tetramethyldiphenoquinone having a melting point of 224° C.

isolate the product which was identified as 3,3'-diethyl-5,5'-dimethyl-diphenoquinone having a melting point of 147° C.

EXAMPLE 12

Oxygen was passed through a vigorously stirred solution of 1 gram of cuprous chloride, 135 ml. of N,N-dimethylacetamide and 10 grams of 2-t-butyl-6-methylphenol heated on a steam bath for 90 minutes. The reaction mixture was cooled and filtered to isolate the red insoluble product identified as 3,3'-t-butyl-5,5'-di-methyl-diphenoquinone having a melting point of 217° C.

It will of course be apparent to those skilled in the art that in addition to the 2,6-disubstituted phenols employed in Examples 7–12, other 2,6-disubstituted phenols in which the alkyl or aryl groups vary may be employed. Obviously, other nitriles and amides and copper salts may be employed in place of those used in the foregoing examples, so that one of the proportions of the copper salt and the amide or nitrile can be varied consistent with there being present sufficient amounts for each complexing purpose. In addition, the conditions under which the oxidation reaction takes place may be varied within wide limits and advantageously within those limits described previously.

The following examples also illustrate the formation of diphenoquinones by the oxidation of phenols by use of amine-basic cupric salt complexes.

EXAMPLE 13

Group A in Table I represents typical phenols which have such large bulky groups in the ortho position that they sterically hinder the formation of polyarylene ethers. Group B represents typical phenols which ordinarily would form polyarylene ethers with this catalyst system at room temperature, but because of the temperature of the reaction, the polymer reaction is hindered and diphenoquinones result. In both groups the diphenoquinone products have substituents corresponding to the phenol starting material. In those reactions run at elevated temperature the water produced in the reaction was removed by carrying out the reaction at reflux and using a Stark and Dean trap to separate the water from the condensate before the latter returned to the reaction vessel. In other respects the general procedure of Example 7 was used.

TABLE 1

GROUP A

| Phenol (g.) | Cuprous salt (g.) | Pyridine (ml.) | Reaction Temp., ° C. Start | Max. | Reaction time (min.) | Color | Melting point (deg.) |
|---|---|---|---|---|---|---|---|
| 2-methyl-6-t-butylphenol (5) | CuCl (1) | 100 | 27 | 44 | 20 | Orange | 210 |
| 2,6-dimethoxyphenol (10) | CuCl (1) | 50 | R.T. | | 20 | Purple | 300 |
| 2,6-diphenylphenol (5) | CuCl (1) | 100 | R.T. | | 60 | Red | 296 |
| 2,6-di-t-butylphenol (100) | CuCl (5) | 500 | 27 | 83 | 32 | Deep red needles with metallic sheen. | 246–246.5 |
| 2,6-di-t-butylphenol (10) | CuOCCH₃ (1) | 100 | 27 | 61 | 30 | do | 246–246.5 |
| 2,6-diisopropylphenol (80) | CuCl (5) | 500 | 27 | 72 | 22 | Deep rose | 225 |
| 2,6-diisopropylphenol (10) | Cu₂SO₃ (1) | 100 | To 90 | | 60 | do | 225 |
| 2,6-diisopropylphenol (10) | CuCl (1) | 2,6-lutidine (100) | Heated to 90 | | 80 | do | 225 |

GROUP B

| Phenol (g.) | Cuprous salt (g.) | Pyridine (ml.) | Reaction Temp. Start | Max. | Reaction time (min.) | Color | Melting point (deg.) |
|---|---|---|---|---|---|---|---|
| 2,6-dimethylphenol (10) | CuCl (1) | Pyridine (5), nitrobenzene (100). | 90 | | 10 | Red | 224 |
| 2,6-dimethylphenol (20) | CuCl (2) | Pyridine (10), methyl propyl ketone (200). | Reflux | | | Red | 224 |
| 2,6-dimethylphenol (20) | CuCl (2) | Pyridine (10), n-nitropropane (200). | Reflux | | | Red | 224 |
| 2,6-dimethylphenol (20) | CuCl (2) | Benzene (100), pyridine (5), nitrobenzene (100). | Reflux | | | Red | 224 |

EXAMPLE 11

Oxygen was passed through a vigorously stirred solution of 1 gram of cuprous chloride, 30 ml. of N,N-dimethylacetamide, 100 ml. of n-decane and 5 grams of 2-ethyl-6-methylphenol heated on a steam bath for 20 minutes. The reaction mixture was cooled and filtered to

EXAMPLE 14

Diphenoquinones may also be made by carrying out the oxidation reaction in an open vessel at a temperature which causes the water to vaporize as it is formed but below the temperature at which there is any substantial volatilization of the other components of the solution.

A vigorously stirred solution of 1 g. of cuprous chloride and 3.6 g. of phenanthridine in 135 ml. of nitrobenzene contained in an open 250 ml. flask was heated in a steam bath at atmospheric pressure and 5 g. of 2,6-dimethylphenol was added. Oxygen was passed through the heated solution for 40 minutes. On cooling, 4.0 grams (81% of theory) of 3,3',5,5'-tetramethyldiphenoquinone (melting point 216-217° C.) separated out as red crystals which were isolated by filtration.

When this reaction was repeated using an equivalent amount of 3,5-diphenylpyridine as the ligand in place of the phenanthridine, a yield of 4.1 grams (83% of theory) of 3,3',5,5'-tetramethyldiphenoquinone (melting point 216-217° C.) was obtained.

EXAMPLE 15

Oxygen was passed into a vigorously stirred solution of 0.2 gram of cuprous chloride, 0.36 gram of N,N-dimethylamine and 10 grams of 2,6-ditertiarybutylphenol. The solution was contained in a reaction vessel immersed in a constant temperature bath maintained at 30° C. Over a period of 30 minutes, the reaction mixture rose to a temperature of 37° C. during which time the 3,3',5,5'-tetra-t-butyldiphenoquinone had separated as deep red needles having metallic sheen which were removed by filtration and washed with ethyl alcohol containing a small amount of hydrochloric acid. The yield was 8.4 grams of crystals having a melting point of 246°–247° C.

EXAMPLE 16

In the same manner as in Example 15, 10 grams of 2,6-diisopropyl phenol were oxidized to yield 7.4 grams of 3,3',5,5'-tetraisopropyldiphenoquinone as deep rose-colored crystals having a melting point of 225° C.

The aliphatic tertiary polyamines may also be used in the preparation of catalysts, for the preparation of diphenoquinones from phenols. These polyamines are particularly useful when preparing diphenoquinones from phenols having large, bulky groups as substituents, since they permit the use of ratios of over 100 moles phenol per mole of catalyst which makes the reaction readily adaptable to a continuous process and reduces the catalyst cost to a negligible amount.

EXAMPLE 17

Oxygen was passed through a vigorously stirred solution of 300 ml. of t-butanol, 0.2 gram (0.002 mole) of cuprous chloride, and 0.24 gram (0.002 mole) of N,N,N',N'-tetramethylethylenediamine contained in a 500 ml. Erlenmeyer flask partially immersed in a water bath whose temperature was 32° C. After the catalyst had dissolved, 50 grams (0.242 mole) of 2,6-di-t-butylphenol was added. Over a period of 18 minutes, the temperature of the reaction mixture rose to 43.5° C. After 23 minutes, the reaction subsided and a brown solid had precipitated. The product was removed by filtration and washed twice with 50 ml. portions of t-butanol containing about 1 ml. of concentrated hydrochloric acid. After drying in vacuo, 48.7 grams of a solid having a melting point of 245° C. was obtained. Dilution of the filtrate with an equal portion of water gave an additional 0.6 gram of solid. When a 20-gram portion of this product was recrystallized from 250 ml. of acetic acid in a Soxhlet apparatus there was obtained 19.1 grams of red-brown crystals having a metallic sheen and melting at 245° C. The total yield after recrystallization was 47.1 grams (0.115 mole; 95%) of 3,3',5,5'-tetra-t-butyldiphenoquinone.

In addition to the aliphatic tertiary polyamines used in Example 21, the following amines have also been used in comparable reactions to obtain similar products:

N-ethyl-N,N',N'-trimethylethylenediamine;
N-methyl-N,N',N'-triethylethylenediamine;
N,N,N',N'-tetramethyl-1,3-propanediamine;
N,N,N',N'-tetraethylethylenediamine;
N,N-dimethyl-N',N'-diethylethylenediamine;
1,2-bis(2-methylpiperidino)-ethane;
N,N,N',N'-tetra-n-amylethylenediamine;
N,N,N',N'-tetraisobutylethylenediamine;
1,2-bis(2,6-dimethylpiperidino)ethane;
N-decyl-N,N',N'-triethylethylenediamine;
2-(β-piperidinoethyl)pyridine;
2-(β-dimethyl aminoethyl)-6-methylpyridine;
2-(β-dimethylaminoethyl)pyridine;
and 2-(β-morpholinoethyl)pyridine.

The diphenoquinone produced from 2-t-butyl-6-methylphenol is 3,3'-di-t-butyl-5,5'-di-methyldiphenoquinone; that from 2,6-dimethoxyphenol 3,3',5,5'-tetramethoxydiphenoquinone, that from 2,6-diphenylphenol 3,3',5,5'-tetraphenyldiphenoquinone, that from 2,6-di-t-butylphenol-3,3',5,5'-tetra-t-butyldiphenoquinone; that from 2,6-diisopropenol is 3,3 - di-t-butyl-5,5'-di-methyldiphenoquinone; and that from 2,6-dimethylphenol-3,3',5,5'-tetramethyldiphenoquinone.

These diphenoquinones have the structural formula

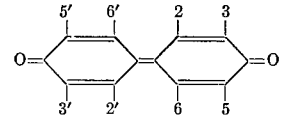

where the numbers show the position where the substituents in the above named products are attached.

Carbon and hydrogen analyses of these material agree well with the theoretical values as shown in Table XIII.

TABLE XIII

| Diphenoquinone | C | | H | |
| --- | --- | --- | --- | --- |
| | Found | Theoretical | Found | Theoretical |
| 3,3',5,5'-tetra-t-butyl | 82.7 | 82.30 | 9.8 | 9.87 |
| 3,3',5,5'-tetramethyl | 79.6 | 79.97 | 7.0 | 6.71 |
| 3,3',5,5'-tetraisopropyl | 82.1 | 81.77 | 9.3 | 9.15 |
| 3,3',5,5'-tetraphenyl | 88.1 | 88.50 | 4.9 | 4.95 |

The diphenoquinones produced in Examples 7–17 can be reacted with an additional amount of the phenol from which each of the diphenoquinones were prepared to produce their corresponding p,p'-biphenols by the methods illustrated in Examples 1–6.

The following examples illustrate the dealkylation of the p,p'-biphenols having tertiary alkyl groups.

EXAMPLE 18

The tetra-t-butylbiphenol of Example 1 was dealkylated to p,p'-biphenol by mixing 2 grams of the 2,2',6,6'-tetra-t-butyl-p,p'-biphenol with 0.1 gram of aluminum isopropoxide and slowly heating the reaction mixture in a vessel equipped with an air condenser. A vigorous evolution of gas began when the temperature reached 240° C., at which point the reaction mixture began to solidify and the temperature was raised to 280° C. until the evolution of gas ceased, requiring a period of 20 minutes. The product was re-crystallized from ethanol containing a small amount of aqueous hydrochloric acid to yield 0.83 gram or a 91.5% yield of p,p'-biphenol having a melting point of 285° C. Although this melting point is somewhat higher than the reported melting point for p,p'-biphenol, sometimes called 4,4'-dihydroxybiphenyl, nevertheless, when an authentic sample was repeatedly re-crystallized, its melting point could be raised to this value and a mixed melting point showed no depression with the p,p'-biphenol of this example. This illustrates the ease with which my process readily prepares this biphenol as a very pure product not contaminated with the other isomers as has been true of the methods used in the past to prepare this compound.

EXAMPLE 19

A solution containing 30 grams of 2-t-butyl-6-methylphenol and 10 grams of 3,3'-di-t-butyl-5,5'-dimethyldiphenoquinone in 40 ml. of pyridine was refluxed at atmospheric pressure for 24 hours. The pyridine was removed by steam distillation and the residue re-crystallized from heptane to yield 16.6 parts of 2,2'-di-t-butyl-6,6'-dimethyl-p,p'-biphenol having a melting point of 185–6° C.

This biphenol was dealkylated to 2,2'-dimethyl-p,p'-biphenol. This reaction was carried out by first dissolving 0.2 gram of aluminum in 5 grams of phenol at 160° C. and then removing the excess phenol at this temperature with a stream of nitrogen. This dealkylation catalyst was added to 5 grams of the 2,2'-di-t-butyl-6,6'-dimethyl-p,p'-biphenol and the mixture heated at 260° C. for 1.5 hours in a reaction vessel equipped with an air condenser. At the end of this time, the evolution of isobutylene had ceased. The reaction mixture was cooled and treated with dilute aqueous hydrochloric acid and extracted with ether. The ether was evaporated and the residue re-crystallized from heptane to obtain 2.3 grams of 2,2'-dimethyl-p,p'-biphenol having a melting point of 154.5–155° C. No depression of melting point was obtained when mixed with an authentic sample of this compound.

The following examples illustrate the alkylation of phenols to produce a 2,6-disubstituted phenol, the oxidative coupling of the phenol to the diphenoquinone, the preparation of the p,p'-biphenol and the dealkylation to the p,p'-biphenol corresponding to the starting phenol.

EXAMPLE 20

In a flask equipped with a stirrer, reflux condenser, and thermometer, 534 grams of ortho-phenylphenol were reacted with 4.5 grams of aluminum powder maintaining a nitrogen atmosphere in the reaction flask. The temperature was slowly raised over a period of three hours to a temperature of 200° C. where the reaction became exothermic and the temperature rose to 272° C., with all of the aluminum dissolving, to produce a solution of aluminum ortho-phenylphenoxide in the excess ortho-phenylphenoxide in the excess ortho-phenylphenol. This solution was transferred to a stainless steel, rocking autoclave which was cooled with ice and evacuated to remove air, after which 170 grams isobutylene were introduced to give a pressure of 10 lbs./sq. in. in the autoclave. The temperature was gradually increased to 150° C. with the pressure dropping to zero indicating that the isobutylene had reacted with the ortho-phenylphenol. After cooling the autoclave overnight to ambient temperature, the product was removed. The autoclave was rinsed with ether and the solution added to the product along with 200 ml. of toluene. This solution was washed with 200 ml. of 5% aqueous hydrochloric acid to destroy the aluminum catalyst, and the solution filtered, after which 750 ml. of additional toluene were added to obtain a good separation between the aqueous and organic layers. The organic layer was distilled to remove the ether and toluene and then further distilled to isolate the 2-t-butyl-6-phenylphenol product.

It had been noted in the above reaction that the pressure had actually decreased to zero when the temperature reached 60° C., indicating that the reaction of isobutylene occurs so readily that pressure equipment did not appear necessary. Therefore, the reaction was repeated in which 170 grams of ortho-phenylphenol were reacted as above with 1 gram of aluminum foil by heating to 250° C. Since this solution of the aluminum ortho-phenylphenoxide in ortho-phenylphenol was a solid at room temperature, it was introduced into a reaction flask equipped with a Dry-Ice-cooled reflux condenser thermometer, stirrer and inlet tube for isobutylene. The reaction was heated to 60° C. in order to melt the contents of the reaction flask. Over a period of 4 hours, 56 grams of isobutylene were slowly introduced without maintaining any pressure on the reaction flask. A slight exotherm was noted, indicating that the isobutylene rapidly reacted with the ortho-phenyl- under these conditions. The reaction mixture was dissolved in ether and washed with 5% aqueous hydrochloric acid solution, followed by a water wash. The organic layer was then dried over anhydrous sodium sulfate.

A careful fractionation of the previously prepared 2-t-butyl-6-phenylphenol produced a constant boiling fraction having a constant index of refraction of 1.5780. A sample of the above solution was taken and the ether evaporated. A slight amount of unreacted ortho-phenylphenol with perhaps some 2-phenyl-4-t-butylphenol was indicated by the fact that the residue had a refractive index of 1.5800. The ether solution was filtered from the desiccant and extracted three times with 5% aqueous sodium hydroxide solution followed by water washes. After again drying over anhydrous sodium sulfate, the ether was removed at atmospheric pressure and the product distilled at a reduced pressure of 0.5 mm. at a temperature of 129° C., yielding 184.7 grams of 2-t-butyl-6-phenylphenol having an index of refraction of 1.5777. Since the alkaline wash removes any unreacted ortho-phenylphenol and any 2-phenyl-4-t-butylphenol, this represents an 82% yield of 2-t-butyl-6-phenylphenol based on the amount of isobutylene used.

EXAMPLE 21

Following the second method of Example 20, 2-t-butyl-6-methylphenol is prepared by substituting 108 grams of ortho-cresol for the 170 grams of ortho-phenylphenol.

EXAMPLE 22

Following the second method of Example 20, 2,6-di-t-butylphenol is prepared by substituting 94 grams of phenol for the 170 grams of ortho-phenylphenol and increasing the amount of isobutylene to 112 grams.

EXAMPLE 23

It is well known that 2,4-disubstituted phenols cannot be oxidized to a diphenoquinone and the fact that a di-substituted phenol can be oxidized to a diphenoquinone is proof that the two substituents are in the 2- and 6-positions. In order to further prove that the phenol of Example 20 is in fact 2-t-butyl-6-phenylphenol and not 2-phenyl-4-t-butylphenol and also to prepare the new and novel 3,3'-di-t-butyl-5,5'-diphenyldiphenoquinone, 100 grams of the 2-t-butyl-6-phenylphenol of Example 20 were dissolved in 500 ml. of ethanol containing 1 gram of cuprous chloride and 2.3 grams of tetramethylethylenediamine. This solution was contained in a reaction flask equipped with a stirrer and immersed in a constant temperature water bath at 25° C. Oxygen was bubbled into the solution and in 10 minutes a precipitate of the diphenoquinone had formed as a red solid. The passage of oxygen was continued over a period of 2 hours with a slight exotherm noted in the reaction mixture. The precipitate was filtered from the solution and washed with ethanol containing a slight amount of concentrated aqueous hydrochloric acid, followed by a wash with ethanol and then drying. There was obtained 85.5 grams of a red solid having a melting point of 213–214° C. This product was recrystallized by dissolving in hot acetic acid and then cooling, giving a red solid having a melting point of 214° C. An elemental analysis showed 85.78 and 85.58% carbon, and 7.32 and 7.21% hydrogen, as compared with the theoretical of 85.68% carbon and 7.19% hydrogen, for 3,3'-di-t-butyl-5,5'-diphenyldiphenoquinone. Infrared absorption showed strong absorption for the carbonyl groups of the diphenoquinone.

EXAMPLE 24

The diphenoquinone of Example 23 as well as the phenol of Example 20 was converted to produce the novel compound 2,2'-di-t-butyl-6,6'-diphenyl-p,p'-biphenol. In a reaction vessel equipped with a reflux condenser, stirrer and thermometer, 30 grams of the 3,3'-di-t-butyl-5,5'-diphenyl-diphenoquinone of Example 23 and 31 grams of 2-t-butyl-6-phenylphenol of Example 20 were heated with 10 parts by volume of pyridine, maintaining a nitrogen atmosphere by passing nitrogen into the reaction vessel. The reaction was slowly heated over a 55-minute period to 200° C. and then for an additional period of 65 minutes to 220° C., by which time the initially deep red solution had become brownish. The hot solution was diluted after cooling below the boiling point of the acetic acid with 200 ml. of acetic acid. On cooling to ambient temperature, 57 grams of a brown solid of crude 2,2'-di-t-butyl-6,6'-diphenyl-p,p'-biphenol crystallized from the solution. The crude product was purified by dissolving in ethanol and adding water to the solution to precipitate the product as a colorless solid having a melting point of 161° C. Analysis of duplicate samples showed a carbon analysis of 85.28 and 85.16% compared to a theoretical of 85.29 and a hydrogen analysis of 7.57 and 7.63 as compared to a theoretical analysis of 7.61 for 2,2'-di-t-butyl-6,6'-diphenyl-p,p'-biphenol. Infrared analysis showed a very sharp absorption at 3540 cm.$^{-1}$ which is characteristic of a hydroxyl group in a krypto-phenol, i.e., one having large, bulky groups on both sides of the phenolic OH.

EXAMPLE 25

The 2,2'-di-t-butyl-6,6'-diphenyl-p,p'-biphenol of Example 24 was dealkylated to produce the novel compound 2,2'-diphenyl-p,p'-biphenol. Aluminum phenoxide was prepared by dissolving 0.2 gram of aluminum in 5 grams of phenol at reflux temperature. This dealkylating catalyst was added to 10 grams of the crude 2,2'-di-t-butyl-6,6'-diphenyl-p,p'-biphenol of Example 24 and heated at reflux temperature in a reaction vessel equipped with an air condenser, which permitted the isobutylene to be distilled from the reaction vessel. The top of the reflux condenser was led to a water trough so that the progress of the evolution of the isobutylene could be followed. After no more isobutylene was evolved, the reaction vessel was cooled and the reaction product diluted with aqueous acetic acid, causing the deposition of a semi-solid which could not be converted into a filterable crystalline material. In order to purify this biphenol, it was heated at a reflux temperature with 50 parts by volume of acetic anhydride for 10 minutes after which 50 parts by volume of acetic acid was added. On cooling to the ambient temperature, there was deposited 6 grams of the diacetate of 2,2'-biphenyl-p,p'-biphenol having a melting point of 205–206° C.

The dealkylation reaction was repeated but in this case 10 grams of the pure 2,2'-di-t-butyl-6,6'-diphenyl-p,p'-biphenol of Example 24 was used and 0.5 gram of aluminum isopropoxide was used in place of the aluminum phenoxide. Here again, the biphenol was obtained as a semi-solid which could not be converted to a filterable crystalline compound. Preparation of the diacetate of this product gave a yield of 9.25 parts of the diacetate of 2,2'-diphenyl-p,p'-biphenol having a melting point of 205–206° C. Recrystallization of the product gave a product melting at 205.5° C. Analysis of duplicate samples of the product showed a carbon content of 78.92, 79.01% compared to the theoretical of 79.22 and a hydrogen analysis of 5.27, 5.32, compared to the theoretical analysis of 5.70 for the diacetate of 2,2'-diphenyl-p,p'-biphenol. Infrared analysis showed absorption at 1756 cm.$^{-1}$ characteristic of the ester groups.

The diacetate was readily hydrolyzed to the free biphenol by adding 25 ml. of concentrated hydrochloric acid and 150 ml. of acetc acd to 20 grams of the diacetate. The mixture was heated at reflux for 3 hours. After cooling and addition of ice a semi-solid separated which gradually solidified while maintained at the temperature of melting ice. The solid was removed by filtration and recrystallized from ethanol to give the pure 2,2'-diphenyl-p,p'-biphenol having a melting point of 138–139° C. Analysis of duplicate samples showed that the biphenol had a carbon content of 84.79% and 85.11% and a hydrogen content of 5.42% and 5.39% compared to a theoretical analysis of 85.18% carbon and 5.36% hydrogen for 2,2'-diphenyl-p,p'-biphenol.

As is evident from the above examples, the net result of these reactions is to convert phenols selected from the class consisting of phenol, ortho-cresol and ortho-phenylphenol to the corresponding biphenols by a very economical process. The olefin that is evolved during the dealkylation process may be recirculated to alkylate more of the starting phenol to produce the 2,6-disubstituted phenols which are then converted to the biphenols and then dealkylated. Since the acid dealkylation catalysts tend to rapidly polymerize the olefins, and this is also true to a lesser extent with the alkaline types of dealkylating catalysts, it is desirable that if the olefin is desired to be reused the process should be carried out to sweep the olefin from the dealkylation zone as rapidly as possible to minimize any loss due to polymerization reaction.

The following examples illustrate how mixed diphenoquinones may be made, converted to mixed p,p'-bisphenols, dealkylated and then separated into the individual components to produce two novel p,p'-biphenols which would be very difficult to prepare if prior art methods were used.

EXAMPLE 26

Oxygen was bubbled through a solution of 1 g. of cuprous chloride, 1.5 ml. of N,N,N',N'-tetramethylenediamine in 250 ml. of isopropanol. Over a one hour period, a solution of 26.7 g. of 2,6-diisopropylphenol and 30.9 g. of 2,6-di-t-butylphenol in 30 ml. of isopropanol was added dropwise to the above solution. During the time the reaction mixture exothermed from 25° to 31° C. The reaction was allowed to continue for 30 minutes after the addition of the phenol mixture was completed. The reaction mixture was cooled to 0° C. and filtered to remove the mixture of diphenoquinones which had precipitated. The filtrate was diluted with water until no more precipitate formed to yield an additional quantity of the diphenoquinones. The combined precipitates were washed with two 50 ml. portions of 2% aqueous hydrochloric acid and air dried. The yield was 49.4 g. of a mixture of the three possible diphenoquinones, 3,3',5,5'-tetraisopropyldiphenoquinone, 3,3',5,5'-tetra-t-butyldiphenoquinone and 3,5-di-t-butyl-3',5'-diisopropyldiphenoquinone.

This mxiture of diphenoquinones when reacted with a mixture of 26.7 g. of 2,6-diisopropylphenol and 30.9 g. of 2,6-di-t-butylphenol as described in Example 24 produces a mixture of 2,2',6,6'-tetraisopropyl-p,p'-biphenol, 2,2'-6,6'-tetra-t-butyl-p,p'-biphenol and 2,6-di-t-butyl-2',6'-diisopropyl-p,p'-bisphenol. The crude mixture of the biphenols obtained by cooling the reaction mixture after dilution with acetic acid is dealkylated as follows.

Aluminum (0.16 g.) was dissolved in 25 ml. of p-cresol and then 75 ml. of o-dichlorobenzene added. In this solution, 42.5 g. of the mixed biphenols were dissolved. The solution was heated to 173–176° C. until 17 ml. of isobutylene had been evolved. After cooling to 100° C. the reaction mixture was diluted with 75 ml. of toluene which precipitated the p,p'-biphenol formed by dealkylation of the 2,2',6,6'-tetra-t-butyl-p,p'-biphenol. After cooling to room temperature 5.5 g. of p,p'-biphenol was obtained by filtration. The filtrate was extracted with two 50 ml. portions of 5% aqueous sodium hydroxide. Neutralization of this aqueous layer with aqueous hydrochloric acid precipitated the novel 2,6-diisopropyl-p,p'-biphenol. After washing with cold chloroform there was obtained a yield of 11.2 g. After recrystallization this product melted at 185.0–186.7° C. and analyzed 79.8% C., 7.9% H compared to the theoretical values of 80.0% C, 8.0% H.

The 2,2',6,6'-tetraisopropyl-p,p'-biphenol remains in the organic layer from the extraction step from which it can be recovered by evaporation of the solvent and purified by recrystallization.

EXAMPLE 27

Following the procedure of Example 26, a mixture of 33.9 g. of 2-t-butyl-6-phenylphenol and 30.9 g. of 2,6-di-t-butylphenol was converted to 62.2 g. of a mixture of 3,3',5,5'-tetra-t-butyldiphenoquinone, 3,3'-di-t-butyl-5,5' - diphenyldiphenoquinone and 3,3',5-tri-t-butyl-5'- phenyldiphenoquinone. Reaction of this mixture of diphenoquinones with a mixture of 33.9 g. of 2-t-butyl-6-phenylphenol and 30.9 g. of 2,6-di-t-butylphenol as described in Example 24 produces a mixture of 2,2',6,6'-tetra-t-butyl-p,p'-biphenol, 2,2' - di-t-butyl-6,6'-diphenyl-p,p'-biphenol and 2,2',6-tri-t-butyl-6-phenyl-p,p'-biphenol. The crude mixture of biphenols obtained by cooling the reaction mixture after dilution with acetic acid is dealkylated as follows.

A solution of 100 g. of the mixture of biphenols in 100 ml. of p-cresol and 1.0 ml. of methane sulfonic acid was heated at 165–176° C. until 59 ml. of isobutylene was obtained. After cooling to 100° C. the reaction mixture was diluted with 100 ml. of toluene as in Example 26 to precipitate the p,p'-biphenol. The filtrate was distilled with Fraction A being distilled at 200°–245° C. and Fraction B distilled at 245°–260° C. Fraction A, weighing 41.8 g. was crude 2-phenyl-p,p'-biphenol, and Fraction B, weighing 29.6 g. was 2,2'-diphenyl-p,p'-biphenol. After recrystallizations of Fraction A once from toluene and once from ethanol-water, the pure, new biphenol, 2-phenyl-p,p'-biphenol, melted at 185.2–186.5° C. and analyzed 82.3% C and 5.3% H compared to theoretical values of 82.4% C and 5.4% H.

As mentioned previously, the biphenols produced by my invention can be used as anti-oxidants, for petroleum products such as cracked gasoline, or may be used as polymer-forming reactants for producing polyesters, polycarbonates, diglycidyl ethers, for producing polyglycidyl ethers, ie., epoxy resins, etc. Because of the fact that some of the biphenols produced by my process have no substituents or only phenyl substituents on the aryl nucleus which are not subject to oxidative attack, these biphenols can be used to make completely aromatic resins which have high oxidative stability.

The novel 2,2'-diphenyl-p,p'-biphenol has a further advantage in that in addition to being highly oxidatively stable, greatly increases the solubility characteristics of the resins prepared from it so that they are soluble in a wider variety of solvents than has previously been found true with completely aromatic polymers containing the known biphenols.

Because of the fact that the 2,2',6,6'-tetraphenyl-p,p'-biphenol has no alkyl substituents on it, it allows completely aromatic polyesters and polycarbonates to be formed which have no alkyl substituents which would be subject to oxidative degradation. Furthermore, both the 2- and 6-positions are substituted. When the hydroxyl group of this biphenol is esterified, the ester group formed is prevented from rearranging to another position as can occur in polyesters where one or both of the positions ortho to the hydroxyl group are not substituted. Such rearrangement causes loss of valuable polymer properties. The following discussion is illustrative of how resins, for example polyesters, polycarbonates, epoxy resins, etc., may be made from the p,p'-biphenols, and especially the novel biphenols of this invention.

Polycarbonate polymers can be made, for example, as described in U.S. Pat. 2,950,266—Goldblum, issued Aug. 23, 1960; U.S. Pat. 2,999,835—Goldberg, issued Sept. 12, 1961 and U.S. Pat. 3,028,365—Schnell et al., issued Apr. 3, 1962. In the preparation of polycarbonates, one mole of at least one p,p'-biphenol is reacted with 1 mole of a carbonate precursor, for example, phosgene, diphenylcarbonate, or the bis-halo-formate formed by reacting 1 mole of at least one p,p'-biphenol with 2 moles of phosgene. Usually, in carrying out these reactions, a slight excess of the carbonate precursor is used to insure complete reaction in the ratio of 1 mole of the biphenol to 1 to 2 moles of the carbonate precursor. The reaction is usually carried out in an inert solvent in the presence of a hydrogen halide acceptor such as a tertiary amine, a metallic base such as a metallic hydroxide or carbonate. In some cases it is desirable to carry out the reaction in the presence of a compound which acts as both a hydrogen halide acceptor and a solvent for example pyridine. The reaction proceeds rapidly at room temperature, although it may be hastened by heating. After sampling of the resinous solution to insure that the desired degree of polymerization has been obtained, preferably an intrinsic viscosity of at least 0.4, the polymer is precipitated by adding a nonsolvent and removed by filtration.

Polyesters of aromatic dicarboxylic acids may be made, for example, by an adaptation of the method disclosed in U.S. 3,036,990—Kantor et al., issued May 29, 1962, wherein 1 mole of at least one dicarboxylic acid, e.g., isophthalic, terephthalic, azelaic acid, etc., in the form of their acyl halides is reacted with at least one p,p'-biphenol in the presence of a solvent for both the reactants and the polymer until no more hydrogen halide is evolved. Particularly useful solvents, especially when the acyl halide is an aromatic diacyl halide, are the commercially available mixtures of halogenated diphenyls or halogenated diphenyl oxides, since these are good solvents and permit the reaction to be carried out at elevated temperatures in reasonable lengths of time, and permit the polyesters to be obtained with intrinsic viscosities of at least 0.4.

Esterification can also be carried out using interfacial techniques wherein the dicarboxyl acid in the form of the acyl chloride is dissolved in an organic solvent and the dihydroxyaryl compound is dissolved in water in the form of an alkali metal salt. The solution is gradually mixed by slowly adding one of the solutions to the other. The reaction is usually carried out at room temperature, as described in more detail in U.S. Pat. 3,028,364—Conix et al., issued Apr. 3, 1962. Furthermore, the polyesters of at least one p,p'-biphenol containing both carboxylic acid and carbonate groups may be made as described in U.S. Pat. 3,030,331—Goldberg, issued Apr. 17, 1962, wherein both an aromatic dicarboxylic acid in the form of its acyl halide and a carbonate precursor such as phosgene are reacted simultaneously with the biphenol.

Copolymers may be made where 2 or more polycarboxylic acids are reacted with at least one p,p'-biphenol or one or more polycarboxylic acids are reacted with at least one biphenol and one or more other polyhydroxy compounds to produce copolymers of interesting properties. In these reactions, 1 mole of at least one p,p'-biphenol and polyhydroxy compound, if present, is reacted with 1 mole of one or more acid halides, although slight excess of the biphenol may be used if it is desired to produce a polymer having terminal hydroxyl groups or an excess of the acyl halide followed by hydrolysis or esterification with a monohydric alcohol to produce a polymer having terminal carboxyl groups or terminal monohydric alcohol ester groups.

The polyesters may be prepared by an ester interchange reaction wherein at least one p,p'-biphenol is first reacted with a lower monocarboxylic acid, usually in the form of the acyl halide or anhydride, for example, acetyl chloride or acetic anhydride, to give the diacetate ester which is then reacted with at least one aromatic dicarboxylic acid, for example, phthalic acid, terephthalic acid, isophthalic acid, etc., usually in a solvent which is a solvent for both the reactants and the polyester at an elevated temperature whereby acetic acid is expelled from the reaction mixture, for example, as described in U.S. 2,595,343—Drewitt et al., issued May 6, 1952. In carrying out this reaction, 1 mole of at least one p,p'-biphenol is reacted with 2 moles of a lower carboxylic acid anhydride, for example, acetic anhydride, to produce the diacetate which is then reacted with the aromatic dicarboxylic acid such as the phthalic acids listed above, using an inert solvent such as for example the chlorinated diphenyls or chlorinated diphenyl oxide, the heating being continued until no more acetic acid is expelled from the solution. In a similar way, aliphatic dicarboxylic acids, e.g., sebacic acid, azelaic acid, etc., may be substituted for part or all of the aromatic dicarboxylic acid.

Epoxy resins may be made by reacting 1 mole of at least one p,p'-biphenol with 2 or more moles of epichlorohydrin, depending on whether a liquid or solid epoxy resin is desired, the larger amounts giving the more fluid resins. Any excess epichlorohydrin acts as a solvent and is recovered from the polymer mixture. The reaction is generally carried out by heating at from 100° C. up to the reflux temperature with the slow addition of caustic to react with the hydrochloric acid evolved and to maintain the reaction mixture approximately neutral. The glycidyl polyether intermediate may be further reacted with other compounds containing active hydrogen, e.g., other mono- or polyhydric phenols, phenol-aldehyde resins, mono- and polyhydric alcohols, amines, amides, ureas, urea-aldehyde resins, melamine, melamine-aldehyde resins, etc., to produce modified polymers. Such modifiers may be reacted as a separate step or along with the curing step in which the epoxy resin is cured with a polycarboxylic acid. Other modifications and details are found, for example, in "Epoxy Resins," by Lee and Neville, McGraw-Hill Book Co., Inc., New York, 1957.

Obviously, other modifications and variation of the present invention are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. The process of producing binary self-condensation products of a phenol having the formula

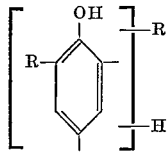

where each R is a monovalent substituent selected from the group consisting of hydrogen, alkyl, alkoxy, aryl, and aryloxy radicals, which comprises reacting said phenol in the liquid phase with a 3,3',5,5'-tetrasubstituted diphenoquinone whose substituents are monovalent radicals selected from the group consisting of alkyl, alkoxy, aryl and aryloxy radicals.

2. The process of claim 1 wherein the reaction is carried out in the presence of a basic or acidic catalyst which (A) is soluble in the liquid phase, (B) is non-reactive with the reaction mixture under the reaction conditions and (C) is selected from the group consisting of trimethylamine, N-heteroarylcyclic amines, metal alkoxides, metal phenoxides of the phenol reactant, carboxyl-substituted hydrocarbons, and carboxyl-substituted halohydrocarbons.

3. The process of claim 1 wherein said reaction is promoted by heating the reaction mixture for a period of time sufficient to cause the disappearance of the color caused by the diphenoquinone.

4. The process of producing a p,p'-biphenol which comprises reacting, in the liquid phase, a phenol having the formula

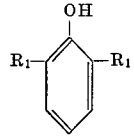

with a diphenoquinone having the formula

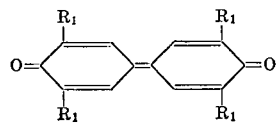

in which the $R_1$ substituents of both the phenol and diphenoquinone are each separately selected from the group consisting of alkyl, alkoxy, aryl and aryloxy.

5. The process of claim 4 wherein the 3 and 3' substituents of the diphenoquinone are each the same substituent, the 5 and 5' substituents of the diphenoquinone are each the same substituent and each of these two substituents are the same as each of the two substituents of the phenol.

6. The process of claim 4 wherein the biphenol product is 2,2',6,6'-tetramethyl-p,p'-biphenol, the phenol is 2,6-dimethylphenol and the diphenoquinone is 3,3',5,5'-tetramethyldiphenoquinone.

7. The process of claim 4 wherein the product is 2,2'-dimethyl - 6,6' - di-t-butyl-p,p'-biphenol, the phenol is 2-methyl-6-t-butylphenol and the diphenoquinone is 3,3'-dimethyl-5,5'-di-t-butyldiphenoquinone.

8. The process of claim 4 wherein the biphenol product is 2,2'-di-t-butyl-6,6'-diphenyl-p,p'-biphenol, the phenol is 2-t-butyl-6-phenylphenol and the diphenoquinone is 3,3'-di-t-butyl-5,5'-diphenyldiphenoquinone.

9. The process of claim 4 wherein the biphenol product is 2,2',6,6'-tetra-t-butyl-p,p'-biphenol, the phenol is 2,6-di-t-butylphenol and the diphenoquinone is 3,3',5,5'-tetra-t-butyldiphenoquinone.

10. The process of claim 4 wherein the biphenol product is 2,2',6,6'-tetraisopropyl-p,p'-biphenol, the phenol is 2,6-diisopropylphenol and the diphenoquinone is 3,3',5,5'-tetraisopropyldiphenoquinone.

11. The process of claim 4 wherein the biphenol product is 2,2',6,6'-tetraphenyl-p,p'-biphenol, the phenol is 2,6-diphenylphenol and the diphenoquinone is 3,3',5,5'-tetraphenyldiphenoquinone.

12. The process of making a p,p'-biphenol which comprises (A) making a 2,6-disubstituted phenol by reacting a phenol selected from the group consisting of phenol, o-cresol and o-phenylphenol in the liquid phase with an olefin precursor of a tertiary alkyl group having from 4 to 8 carbon atoms in the presence of an ortho-directing alkylation catalyst under alkylating conditions, (B) converting the 2,6-disubstituted phenol of (A) to a 3,3',5,5'-tetrasubstituted diphenoquinone by reacting oxygen with said phenol using as the oxygen-carrying intermediate a solution, in which said phenol is soluble, of a complex of a basic cupric salt with a substituted hydrocarbon in which the substituents are selected from the group consisting of amino groups free of aryl substituents directly bonded to the nitrogen atom, cyano and tertiary carbamoyl groups (C) making a 2,2',6,6'-tetrasubstituted biphenol by reacting the diphenoquinone produced in (B) with an additional quantity of the 2,6-disubstituted phenol of (A) in the liquid phase, and (D) removing the tertiary-alkyl substituents from the biphenol of (C) by contacting it in the liquid phase with a dealkylation catalyst under dealkylating conditions.

13. The process of claim 12 wherein the reaction of (A) is carried out using a metal phenoxide alkylation catalyst whose phenolic moiety is that of the phenol reactant of (A), the reaction of (D) is carried out using a metal phenoxide dealkylation catalyst and the reaction of (C) is promoted by heating the liquid phase.

14. The process of claim 12 wherein the final biphenol product is p,p'-biphenol, the phenol product of (A) and the phenol of (B) and (C) is 2,6-di-t-butylphenol, the olefin of (A) is isobutylene, the phenol reactant of (A) is phenol, the alkylation catalyst of (A) is aluminum phenoxide, the diphenoquinone of (B) and (C) is 3,3'-5,5'-tetra-t-butyldiphenoquinone, the biphenol product of (C) is 2,2',6,6'-tetra-t-butyl-p,p'-biphenol and an aluminum phenoxide dealkylation catalyst is used in the reaction of (D).

15. The process of claim 12 wherein the final biphenol product is 2,2'-dimethyl-p,p'-biphenol, the phenol product of (A) and the phenol of (B) and (C) is 2-t-butyl-6-methylphenol, the olefin of (A) is isobutylene, the phenol reactant of (A) is o-cresol, the alkylation catalyst of (A) is aluminum o-cresoxide, the diphenoquinone of (B) and (C) is 3,3'-di-t-butyl-5,5'-dimethyldiphenoquinone, the biphenol product of (C) is 2,2'-di-t-butyl-6,6'-dimethyl-p,p'-biphenol and an aluminum phenoxide dealkylation catalyst is used in the reaction of (D).

16. The process of claim 12 wherein the final biphenol product is 2,2'-diphenyl-p,p'-biphenol, the phenol product of (A) and the phenol of (B) and (C) is 2-t-butyl-6-phenylphenol, the olefin of (A) is isobutylene, the phenol reactant of (A) is o-phenylphenol, the alkylation catalyst of (A) is aluminum o-phenylphenoxide, the diphenoquinone of (B) and (C) is 3,3'-di-t-butyl-5,5'-diphenyldiphenoquinone, the biphenol product of (C) is 2,2'-di-t-butyl-6,6'-diphenyl-p,p'-biphenol and an aluminum phenoxide dealkylation catalyst is used in the reaction of (D).

17. As new chemical compounds, the substituted biphenols selected from the group consisting of 2,2',6,6'-tetraphenyl-p,p'-biphenol, 2,2'-diphenyl - p,p' - biphenol, 2,2'-di-t-butyl-6,6'-diphenyl-p,p'-biphenol, and 2 - phenyl-p,p'-biphenol.

18. The compound of claim 17 named 2,2',6,6'-tetraphenyl-p,p'-biphenol.

19. The compound of claim 17 named 2,2'-di-t-butyl-6,6'-diphenyl-p,p'-biphenol.

20. The compound of claim 17 named 2,2'-diphenyl-p,p'-biphenol.

21. The compound of claim 17 named 2-phenyl-p,p'-biphenol.

References Cited

UNITED STATES PATENTS

| | | | |
|---|---|---|---|
| 2,560,666 | 7/1951 | Stevens et al. | 260—624 X |
| 2,655,547 | 10/1953 | Bryner | 260—624 X |
| 2,831,898 | 10/1957 | Ecke | 260—620 |
| 2,923,745 | 4/1958 | Buls et al. | 260—624 X |
| 3,091,646 | 5/1963 | Leston | 260—624 |
| 2,285,563 | 6/1942 | Britton et al. | 260—620 |
| 3,153,098 | 10/1964 | Boag | 260—620 |

FOREIGN PATENTS

| | | | |
|---|---|---|---|
| 776,204 | 7/1951 | Great Britain | 260—621 |
| 661,025 | 4/1963 | Canada | 260—621 D |

OTHER REFERENCES

Norris et al., "J. Am. Chem. Soc.," vol. 61, pp. 1163–1170 (1939).

Stoughton et al., Journal of the American Chemical Society, vol. 56, pp. 2007–2009, 1934.

LEON ZITVER, Primary Examiner

N. P. MORGENSTERN, Assistant Examiner

U.S. Cl. X.R.

23—356; 44—78; 252—438, 404; 260—45.95, 47 R, 47 EP, 47 XA, 396 R, 468 N, 613 R, 619 D, 619 F, 620, 621 R, 624 R, 626 R, 626T, 860